US012679702B2

(12) United States Patent
Vihonen et al.

(10) Patent No.: US 12,679,702 B2
(45) Date of Patent: Jul. 14, 2026

(54) DYNAMIC FLEX COMPENSATION, COORDINATED HOIST CONTROL, AND ANTI-SWAY CONTROL FOR LOAD HANDLING MACHINES

(71) Applicant: Kalmar Finland Oy, Tampere (FI)

(72) Inventors: Juho Vihonen, Kangasala (FI); Mohammad Aref, Tampere (FI); Vladimír Petrík, Banská Bystrica (SK); Karol Arndt, Espoo (FI); David Blanco Mulero, Espoo (FI); Ville Kyrki, Espoo (FI); Juuso Naskali, Vesilahti (FI); Marko Rasinen, Tampere (FI)

(73) Assignee: Kalmar Finland Oy, Tampere (FI)

( * ) Notice: Subject to any disclaimer, the term of this patent is extended or adjusted under 35 U.S.C. 154(b) by 59 days.

(21) Appl. No.: 19/007,633

(22) Filed: Jan. 2, 2025

(65) Prior Publication Data

US 2025/0128917 A1 Apr. 24, 2025

Related U.S. Application Data

(63) Continuation of application No. 17/849,145, filed on Jun. 24, 2022, now Pat. No. 12,227,395.

(30) Foreign Application Priority Data

Jun. 24, 2021 (FI) ..................................... 20215750

(51) Int. Cl.
*B66C 13/06* (2006.01)
*B66C 13/46* (2006.01)
*B66C 19/00* (2006.01)

(52) U.S. Cl.
CPC ............ *B66C 13/063* (2013.01); *B66C 13/46* (2013.01); *B66C 19/007* (2013.01)

(58) Field of Classification Search
CPC ..... B66C 13/063; B66C 13/46; B66C 19/007; B66C 13/48; B66C 13/085; B66C 13/22;
(Continued)

(56) References Cited

U.S. PATENT DOCUMENTS 6,234,332 B1 5/2001 Monzen et al.
6,496,765 B1 12/2002 Robinett, III et al.
(Continued)

FOREIGN PATENT DOCUMENTS

CN 108190751 A 6/2018
CN 107215777 A 5/2019
(Continued)

OTHER PUBLICATIONS

"AU Application No. 2022204468 Office Action", Nov. 23, 2022, 9 pages.
(Continued)

*Primary Examiner* — Ig T An
(74) *Attorney, Agent, or Firm* — Laine IP Oy

(57) ABSTRACT

Various example embodiments relate to motion control of a target such as a suspended load. An apparatus may comprise: a floating base comprising an exteroceptive observation system configured to measure a position or velocity of at least one target with respect to a reference coordinate frame moving with the floating base. The floating base may further comprise an inertial measurement unit configured to measure at least one inertial state of the floating base with respect to an inertial reference coordinate frame. Position or velocity compensation for the at least one target may be performed based on the at least one inertial state of the floating base.

26 Claims, 10 Drawing Sheets

(58) Field of Classification Search
CPC ....... B66C 13/16; B66C 19/002; B66C 23/36; B66C 23/62; B66C 23/68; B66C 13/06; B66F 9/065; B66F 9/0755; B66F 9/24
See application file for complete search history.

(56) References Cited

U.S. PATENT DOCUMENTS

| | | | | |
|---|---|---|---|---|
| 7,367,464 | B1 | 5/2008 | Agostini et al. | |
| 9,919,901 | B2 * | 3/2018 | Savaresi | B66C 13/30 |
| 2005/0103738 | A1 * | 5/2005 | Recktenwald | B66C 13/063 212/275 |
| 2007/0050115 | A1 * | 3/2007 | Discenzo | B66C 13/22 701/50 |
| 2010/0230370 | A1 | 9/2010 | Schneider et al. | |
| 2011/0218714 | A1 * | 9/2011 | Stantchev | B66C 13/063 701/50 |
| 2015/0203334 | A1 * | 7/2015 | Moran | B66C 19/005 212/284 |
| 2017/0129749 | A1 * | 5/2017 | Rodríguez Mijangos | B66C 13/08 |
| 2021/0122615 | A1 | 4/2021 | Rauscher et al. | |

FOREIGN PATENT DOCUMENTS

| | | | |
|---|---|---|---|
| CN | 113003415 | A | 6/2021 |
| EP | 0841295 | A2 | 5/1998 |
| EP | 2910512 | A1 | 8/2015 |
| EP | 3566998 | A1 | 11/2019 |
| NO | 20181613 | A1 | 6/2020 |
| RU | 2013156680 | A | 6/2015 |
| WO | WO2019229751 | A1 | 12/2019 |

OTHER PUBLICATIONS

"EP Application No. 22180718.3 Extended European Search Report", Mar. 27, 2023, 9 pages.

"FI Application No. 20215750 Search Report", Nov. 19, 2021, 2 pages.

"IN Application No. 202244036280 Office Action", Apr. 26, 2023, 6 pages.

Aref et al: Geometrical workspace analysis of a cable-driven redundant parallel manipulator: KNTU CDRPM. 2008 IEEE/RSJ International Conference on Intelligent Robots and Systems, Sep. 2008, pp. 1958-1963.

Kruk et al: AHRS Based Anti-Sway Tower Crane Controller. 2019 20th International Conference on Research and Education in Mechatronics (REM), 2019, pp. 1-6.

Le et al: Adaptive neural network sliding mode control of shipboard container cranes considering actuator backlash. Mechanical Systems and Signal Processing, 2018, vol. 112, pp. 233-250.

Loloei et al: Wrench feasible workspace analysis of cable-driven parallel manipulators using LMI approach. IEEE/ASME International Conference on Advanced Intelligent Mechatronics, Jul. 2009, pp. 1034-1039.

* cited by examiner

DYNAMIC FLEX COMPENSATION, COORDINATED HOIST CONTROL, AND ANTI-SWAY CONTROL FOR LOAD HANDLING MACHINES

TECHNICAL FIELD

Various example embodiments generally relate to the field of load handling. In particular, some example embodiments relate to dynamic flex compensation, coordinated hoist control, or anti-sway control for load handling machines such as for example yard cranes, reach stackers, straddle carriers, or the like.

BACKGROUND

Efficient handling of heavy loads may be desired in various fields of industry. For example, lifting and handling cargo containers may be challenging due to strong winds and other external disturbances occurring at a yard environment. For various reasons it may be further desired to reduce the mass of different components of load handling machines, which may cause further challenges for controlling movement of the load.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments enable to improve controlling movement of target(s), for example a suspended load such as a container. This and other benefits may be achieved by the features of the independent claims. Further advantageous implementation forms are provided in the dependent claims, the description, and the drawings.

According to a first aspect, an apparatus may comprise: a floating base comprising an exteroceptive observation system configured to measure a position or velocity of at least one target with respect to a reference coordinate frame moving with the floating base, wherein the floating base further comprises an inertial measurement unit configured to measure at least one inertial state of the floating base with respect to an inertial reference coordinate frame; and means for performing position or velocity compensation for the at least one target based on the at least one inertial state of the floating base.

According to an example embodiment of the first aspect, the apparatus may further comprise: means for performing the position or velocity compensation based on statistical inference on the measured position or velocity of the at least one target and the at least one inertial state of the floating base.

According to an example embodiment of the first aspect, the floating base may comprise a boom configured to hoist or manipulate the at least one target, or the floating base may comprise a girder of a crane.

According to an example embodiment of the first aspect, the floating base may comprise a trolley movable along a girder of a crane. The at least one inertial state of the floating base may comprise acceleration of the trolley. The apparatus may further comprise: means for determining a position of the trolley with respect to the girder; and means for performing the position or velocity compensation for the at least one target further based on the position of the trolley with respect to the girder.

According to an example embodiment of the first aspect, the apparatus may further comprise: means for fusing the position of the trolley and the acceleration of the trolley with a Kalman filter; means for determining an error signal for an adaptive filter based on a subtraction of the position of the trolley and an output of the Kalman filter; and means for filtering the measured position or velocity of the at least one target with the adaptive filter to perform the position or velocity compensation for the at least one target.

According to an example embodiment of the first aspect, the adaptive filter may comprise a recursive least squares filter.

According to an example embodiment of the first aspect, the apparatus may further comprise: means for fusing the position of the trolley and the acceleration of the trolley with a first neural network; and means for performing the position or velocity compensation for the at least one target by a second neural network based on the measured position or velocity of the at least one target and an output of the first neural network.

According to an example embodiment of the first aspect, the position or velocity of the at least one target may be indicative of the position or velocity of the at least one target along a first axis of the inertial reference coordinate frame substantially parallel to the girder. The acceleration of the trolley may be indicative of the acceleration of the trolley along the first axis.

According to an example embodiment of the first aspect, the apparatus may further comprise: means for measuring a speed of the trolley with respect to the girder; and means for determining the position of the trolley with respect to the girder based on an integration of the speed of the trolley with respect to the girder with respect to time.

According to an example embodiment of the first aspect, the crane may be movable along a second axis of the inertial reference coordinate frame substantially perpendicular to the girder. The position or velocity of the at least one target may be further indicative of the position or velocity of the at least one target along the second axis and the acceleration of the trolley may be further indicative of the acceleration of the trolley along the second axis.

According to an example embodiment of the first aspect, the apparatus may further comprise: means for measuring a speed of the crane with respect to the second axis; and means for determining the position of the trolley further based on an integration of the speed of the crane with respect to the second axis with respect to time.

According to an example embodiment of the first aspect, the apparatus may further comprise: means for performing motion control of the at least one target based on the position or velocity of the at least one target.

According to an example embodiment of the first aspect, the at least one target may comprise a suspended load.

According to a second aspect, and apparatus may comprise: a plurality of hoists for operating a suspended load; means for determining a Cartesian space force or velocity for controlling movement of the suspended load; means for mapping the Cartesian space force or velocity to a plurality of tension forces or torques for the plurality of hoists based on a multivariable mapping function; means for adjusting the plurality of tension forces or torques with at least one neutral element of the multivariate mapping function such that each of the plurality of tension forces or torques is above or equal to a threshold, wherein the adjustment of the at least one neutral element does not change the mapping of the Cartesian space force or velocity to the plurality of tension forces or torques.

According to an example embodiment of the second aspect, the Cartesian space force or velocity may be configured to control planar movement and/or planar rotation of the suspended load.

According to an example embodiment of the second aspect, the Cartesian space force or velocity may be configured to control planar movement of the suspended load along a first axis and a second axis of an inertial reference coordinate frame and planar rotation around a third axis of the inertial reference coordinate frame.

According to an example embodiment of the second aspect, the first axis and the second axis may be perpendicular to each other and parallel to ground. The third axis may be perpendicular to the first axis and the second axis.

According to an example embodiment of the second aspect, the multivariable mapping function may comprise a subset of a Jacobian matrix and the at least one neutral element may be within a null space of the subset of the Jacobian matrix.

According to an example embodiment of the second aspect, the subset of the Jacobian matrix may comprise columns of the Jacobian matrix corresponding to linear force components of the Cartesian space force for the first axis and the second axis and a torque component of the Cartesian space force for the third axis.

According to an example embodiment of the second aspect, the plurality of hoists may be fixedly coupled to a trolley of a crane at a first set of connection points and to a headblock of the crane at a second set of connection points. The headblock may be configured to be attached to the suspended load. The apparatus may further comprise: means for determining, based on locations of the first set of connection points and the second set of connection points, a plurality of Cartesian unit vectors, $\hat{S}_i$, corresponding to directions of the plurality of hoists; means for determining a plurality of Cartesian torque arm vectors, $\vec{E}_i$, from a center of the headblock to the second set of connection points, wherein a transpose $J^T$ of the Jacobian matrix is of size 6×N, and wherein $$J^T = \begin{bmatrix} \hat{S}_i & \dots & \hat{S}_N \\ \vec{E}_1 \times \hat{S}_i & \dots & \vec{E}_N \times \hat{S}_N \end{bmatrix},$$

where N≥4 is a number of the plurality of hoists and X denotes a cross product, and wherein the plurality of tension forces or torques, $\tau$, satisfies $F_c = J^T \tau$, where $F_c$ comprises the Cartesian space force.

According to an example embodiment of the second aspect, the trolley may be movable along a girder of the crane, and the apparatus may further comprise: means for determining a location of the trolley with respect to the girder; and means for determining the locations of the first set of connection points based on the location of the trolley with respect to the girder.

According to an example embodiment of the second aspect, the apparatus may further comprise: means for determining a location of the headblock; and means for determining locations of the second set of connection points based on the location of the headblock.

According to an example embodiment of the second aspect, the apparatus may further comprise: means for determining the Cartesian space force or velocity based on a linear controller configured to control the movement of the suspended load based on a set of desired input values and feedback data indicative of at least the movement of the suspended load.

According to an example embodiment of the second aspect, the apparatus may further comprise: means for applying at least one Cartesian space force or velocity correction term to the Cartesian space force or velocity.

According to an example embodiment of the second aspect, the apparatus may further comprise: means for applying at least one hoist space tension force or torque correction term to the plurality of tension forces or torques.

According to an example embodiment of the second aspect, the apparatus may further comprise: means for determining hoist feedback data based on applying an inverse of the multivariate mapping function to hoist space measurement data associated with the plurality of hoists, wherein the linear controller is further configured to control the movement of the suspended load based on the hoist feedback data.

According to an example embodiment of the second aspect, the hoist space measurement data may comprise at least one of: a plurality of winch velocities, a plurality of winch positions, a plurality of winch torques, or errors for the plurality of hoists.

According to an example embodiment of the second aspect, the apparatus according to any example embodiment of the second aspect may comprise the apparatus according to any example embodiment of the first aspect.

According to a third aspect, an apparatus may comprise: a plurality of hoists for operating a suspended load; means for determining a Cartesian space force or velocity for controlling movement of the suspended load; means for mapping the Cartesian space force or velocity to a plurality of tension forces or torques for the plurality of hoists; means for determining at least one first anti-sway control term based on a first neural network configured to take as input a height of the suspended payload from ground and a mass of the suspended load; means for adjusting the Cartesian space force or velocity or the plurality of tension forces or torques based on the at least one first anti-sway control term and at least two velocities associated with the suspended load; and means for applying the plurality of tension forces or torques to the plurality of hoists to control the movement of the suspended load.

According to an example embodiment of the third aspect, the apparatus may further comprise: means for determining at least one second anti-sway control term based on a second neural network configured to take as input the height of the payload from the ground, the mass of the payload, and wind speed and/or wind direction; means for adjusting the Cartesian space force or velocity or the plurality of tension forces or torques further based on the at least one second anti-sway control term.

According to an example embodiment of the third aspect, the at least one first anti-sway control term may comprise an anti-sway control matrix, and the adjustment of the Cartesian space force or velocity or the plurality of tension forces or torques may comprise a multiplication or a sum of the anti-sway control matrix and a velocity vector comprising the at least two velocities associated with the suspended load.

According to an example embodiment of the third aspect, the at least one second anti-sway control term may comprise an anti-sway control vector, and the adjustment of the Cartesian space force or velocity or the plurality of tension forces or torques may further comprise addition of the anti-sway control vector to a result of the multiplication or the sum of the anti-sway control matrix and the velocity vector.

According to an example embodiment of the third aspect, the apparatus may further comprise: means for adjusting the plurality of tension forces or torques based on the at least one first anti-sway control term and/or the at least one second anti-sway control term. The first neural network may be configured to determine the anti-sway control term for hoist-space control.

According to an example embodiment of the third aspect, the at least two velocities may comprise velocities of at least two reference points stationary with respect to the suspended load.

According to an example embodiment of the third aspect, velocities of the at least two reference points may comprise velocities with respect to a first axis and a second axis, wherein the first axis and the second axis are perpendicular to each other and parallel to the ground.

According to an example embodiment of the third aspect, the at least two reference points may comprise at least two corners of a spreader coupled to the plurality of hoists or at least two corners of the suspended load. The spreader may be configured to be attached to the suspended load.

According to an example embodiment of the third aspect, the apparatus may further comprise: means for adjusting the Cartesian space force or velocity based on the at least one first anti-sway control term and/or the at least one second anti-sway control term. The first neural network may be configured to determine the first anti-sway control term for Cartesian space control.

According to an example embodiment of the third aspect, the at least two velocities may comprise a linear velocity of the suspended load with respect to a first axis, a linear velocity of the suspended load with respect to a second axis, and an angular velocity of the suspended load with respect to a third axis. The first axis and the second axis may be perpendicular to each other and parallel to the ground and the third axis may be perpendicular to the first axis and the second axis.

According to an example embodiment of the third aspect, the apparatus may further comprise: a linear controller configured to determine the Cartesian space force or velocity for controlling the movement of the suspended load based on a set of desired input values and feedback data indicative of the movement of the suspended load.

According to an example embodiment of the third aspect, the first neural network may comprise a neural network trained based on reinforcement learning with a first reward function comprising a linear velocity and an angular velocity of the suspended load at a plane defined by the first axis and the second axis or with a second reward function comprising the at least two velocities associated with the suspended load and a ratio between the plurality of tension forces or torques and a maximum supported anti-sway torque value.

According to an example embodiment of the third aspect, the second neural network may comprise a neural network trained based on a gradient descent algorithm with a cost function comprising a steady-state position and a steady-state orientation of the suspended load.

According to an example embodiment of the second aspect, the apparatus according to any example embodiment according to the second aspect may comprise the apparatus according to any example embodiment of the third aspect.

According to a fourth aspect a method may comprise: measuring, by an exteroceptive observation system coupled to a floating base, a position or velocity of at least one target with respect to a reference coordinate frame moving with the floating base; measuring, by an inertial measurement unit, at least one inertial state of the floating base with respect to an inertial reference coordinate frame; and performing position or velocity compensation for the at least one target based on the at least one inertial state of the floating base.

According to an example embodiment of the fourth aspect, the method may further comprise: performing the position or velocity compensation based on statistical inference on the measured position or velocity of the at least one target and the at least one inertial state of the floating base.

According to an example embodiment of the fourth aspect, the floating base may comprise a boom configured to hoist or manipulate the at least one target, or the floating base may comprise a girder of a crane.

According to an example embodiment of the fourth aspect, the floating base may comprise a trolley movable along a girder of a crane. The at least one inertial state of the floating base may comprise acceleration of the trolley. The method may further comprise: determining a position of the trolley with respect to the girder; and performing the position or velocity compensation for the at least one target further based on the position of the trolley with respect to the girder.

According to an example embodiment of the fourth aspect, the method may further comprise: fusing the position of the trolley and the acceleration of the trolley with a Kalman filter; determining an error signal for an adaptive filter based on a subtraction of the position of the trolley and an output of the Kalman filter; and filtering the measured position or velocity of the at least one target with the adaptive filter to perform the position or velocity compensation for the at least one target.

According to an example embodiment of the fourth aspect, the adaptive filter may comprise a recursive least squares filter.

According to an example embodiment of the fourth aspect, the method may further comprise: fusing the position of the trolley and the acceleration of the trolley with a first neural network; and performing the position or velocity compensation for the at least one target by a second neural network based on the measured position or velocity of the at least one target and an output of the first neural network.

According to an example embodiment of the fourth aspect, the position or velocity of the at least one target may be indicative of the position or velocity of the at least one target along a first axis of the inertial reference coordinate frame substantially parallel to the girder. The acceleration of the trolley may be indicative of the acceleration of the trolley along the first axis.

According to an example embodiment of the fourth aspect, the method may further comprise: measuring a speed of the trolley with respect to the girder; and determining the position of the trolley with respect to the girder based on an integration of the speed of the trolley with respect to the girder with respect to time.

According to an example embodiment of the fourth aspect, the crane may be movable along a second axis of the inertial reference coordinate frame substantially perpendicular to the girder. The position or velocity of the at least one target may be further indicative of the position or velocity of the at least one target along the second axis and the acceleration of the trolley may be further indicative of the acceleration of the trolley along the second axis.

According to an example embodiment of the fourth aspect, the method may further comprise: measuring a speed of the crane with respect to the second axis; and determining the position of the trolley further based on an integration of the speed of the crane with respect to the second axis with respect to time.

According to an example embodiment of the fourth aspect, the method may further comprise: performing motion control of the at least one target based on the position or velocity of the at least one target.

According to an example embodiment of the fourth aspect, the at least one target may comprise a suspended load.

According to a fifth aspect, a method may comprise: determining a Cartesian space force or velocity for controlling movement of the suspended load, wherein the suspended load is operable with a plurality of hoists; mapping the Cartesian space force or velocity to a plurality of tension forces or torques for the plurality of hoists based on a multivariable mapping function; and adjusting the plurality of tension forces or torques with at least one neutral element of the multivariate mapping function such that each of the plurality of tension forces or torques is above or equal to a threshold, wherein the adjustment of the at least one neutral element does not change the mapping of the Cartesian space force or velocity to the plurality of tension forces or torques.

According to an example embodiment of the fifth aspect, the method may further comprise: controlling, based on the Cartesian space force or velocity, planar movement and/or planar rotation of the suspended load.

According to an example embodiment of the fifth aspect, the method may further comprise: controlling, based on the Cartesian space force or velocity, the planar movement of the suspended load along a first axis and a second axis of an inertial reference coordinate frame and planar rotation around a third axis of the inertial reference coordinate frame.

According to an example embodiment of the fifth aspect, the first axis and the second axis may be perpendicular to each other and parallel to ground. The third axis may be perpendicular to the first axis and the second axis.

According to an example embodiment of the fifth aspect, the multivariable mapping function may comprise a subset of a Jacobian matrix and the at least one neutral element may be within a null space of the subset of the Jacobian matrix.

According to an example embodiment of the fifth aspect, the subset of the Jacobian matrix may comprise columns of the Jacobian matrix corresponding to linear force components of the Cartesian space force for the first axis and the second axis and a torque component of the Cartesian space force for the third axis.

According to an example embodiment of the fifth aspect, the plurality of hoists may be fixedly coupled to a trolley of a crane at a first set of connection points and to a headblock of the crane at a second set of connection points. The headblock may be configured to be attached to the suspended load. The method may further comprise: determining, based on locations of the first set of connection points and the second set of connection points, a plurality of Cartesian unit vectors, $\hat{S}_i$, corresponding to directions of the plurality of hoists; determining a plurality of Cartesian torque arm vectors, $\vec{E}_i$, from a center of the headblock to the second set of connection points, wherein a transpose $J^T$ of the Jacobian matrix is of size 6×N, and wherein $$J^T = \begin{bmatrix} \hat{S}_i & \ldots & \hat{S}_N \\ \vec{E}_1 \times \hat{S}_i & \ldots & \vec{E}_N \times \hat{S}_N \end{bmatrix},$$

where N≥4 is a number of the plurality of hoists and × denotes a cross product, and wherein the plurality of tension forces or torques, $\tau$, satisfies $F_c = J^T\tau$, where $F_c$ comprises the Cartesian force.

According to an example embodiment of the fifth aspect, the trolley may be movable along a girder of the crane, and the method may further comprise: determining a location of the trolley with respect to the girder; and determining the locations of the first set of connection points based on the location of the trolley with respect to the girder.

According to an example embodiment of the fifth aspect, the method may further comprise: determining a location of the headblock; and determining locations of the second set of connection points based on the location of the headblock.

According to an example embodiment of the fifth aspect, the method may further comprise: determining the Cartesian space force or velocity based on a linear controller configured to control the movement of the suspended load based on a set of desired input values and feedback data indicative of at least the movement of the suspended load.

According to an example embodiment of the fifth aspect, the method may further comprise: applying at least one Cartesian space force or velocity correction term to the Cartesian space force or velocity.

According to an example embodiment of the fifth aspect, the method may further comprise: applying at least one hoist space tension force or torque correction term to the plurality of tension forces or torques.

According to an example embodiment of the fifth aspect, the method may further comprise: determining hoist feedback data based on applying an inverse of the multivariate mapping function to hoist space measurement data associated with the plurality of hoists; and controlling, by the linear controller, the movement of the suspended load based on the hoist feedback data.

According to an example embodiment of the fifth aspect, the hoist space measurement data may comprise at least one of: a plurality of winch velocities, a plurality of winch positions, a plurality of winch torques, or errors for the plurality of hoists.

According to an example embodiment of the fifth, the method according to any example embodiment of the fifth aspect may comprise any example embodiment of the method of the fourth aspect.

According to a sixth aspect, a method may comprise: determining a Cartesian space force or velocity for controlling movement of a suspended load, wherein the suspended load is operable with a plurality of hoists; mapping the Cartesian space force or velocity to a plurality of tension forces or torques for the plurality of hoists; determining at least one first anti-sway control term based on a first neural network configured to take as input a height of the suspended payload from ground and a mass of the suspended load; adjusting the Cartesian space force or velocity or the plurality of tension forces or torques based on the at least one first anti-sway control term and at least two velocities associated with the suspended load; and applying the plurality of tension forces or torques to the plurality of hoists to control the movement of the suspended load.

According to an example embodiment of the sixth aspect, the method may further comprise: determining at least one second anti-sway control term based on a second neural network configured to take as input the height of the payload from the ground, the mass of the payload, and wind speed and/or wind direction; adjusting the Cartesian space force or velocity or the plurality of tension forces or torques further based on the at least one second anti-sway control term.

According to an example embodiment of the sixth aspect, the at least one first anti-sway control term may comprise an anti-sway control matrix, and the adjustment of the Cartesian space force or velocity or the plurality of tension forces or torques may comprise a multiplication or a sum of the anti-sway control matrix and a velocity vector comprising the at least two velocities associated with the suspended load.

According to an example embodiment of the sixth aspect, the at least one second anti-sway control term may comprise an anti-sway control vector, and the adjustment of the Cartesian space force or velocity or the plurality of tension forces or torques may further comprise addition of the anti-sway control vector to a result of the multiplication or the sum of the anti-sway control matrix and the velocity vector.

According to an example embodiment of the sixth aspect, the method may further comprise: adjusting the plurality of tension forces or torques based on the at least one first anti-sway control term and/or the at least one second anti-sway control term. The first neural network may determine the anti-sway control term for hoist-space control.

According to an example embodiment of the sixth aspect, the at least two velocities may comprise velocities of at least two reference points stationary with respect to the suspended load.

According to an example embodiment of the sixth aspect, velocities of the at least two reference points may comprise velocities with respect to a first axis and a second axis, wherein the first axis and the second axis are perpendicular to each other and parallel to the ground.

According to an example embodiment of the sixth aspect, the at least two reference points may comprise at least two corners of a spreader coupled to the plurality of hoists or at least two corners of the suspended load. The spreader may be configured to be attached to the suspended load.

According to an example embodiment of the sixth aspect, the method may further comprise: adjusting the Cartesian space force or velocity based on the at least one first anti-sway control term and/or the at least one second anti-sway control term. The first neural network may determine the first anti-sway control term for Cartesian space control.

According to an example embodiment of the sixth aspect, the at least two velocities may comprise a linear velocity of the suspended load with respect to a first axis, a linear velocity of the suspended load with respect to a second axis, and an angular velocity of the suspended load with respect to a third axis. The first axis and the second axis may be perpendicular to each other and parallel to the ground and the third axis may be perpendicular to the first axis and the second axis.

According to an example embodiment of the sixth aspect, the method may further comprise: determining, by a linear controller, the Cartesian space force or velocity for controlling the movement of the suspended load based on a set of desired input values and feedback data indicative of the movement of the suspended load.

According to an example embodiment of the sixth aspect, the first neural network may comprise a neural network trained based on reinforcement learning with a first reward function comprising a linear velocity and an angular velocity of the suspended load at a plane defined by the first axis and the second axis or with a second reward function comprising the at least two velocities associated with the suspended load and a ratio between the plurality of tension forces or torques and a maximum supported anti-sway torque value.

According to an example embodiment of the sixth aspect, the second neural network may comprise a neural network trained based on a gradient descent algorithm with a cost function comprising a steady-state position and a steady-state orientation of the suspended load.

According to an example embodiment of the fifth aspect, the method according to any example embodiment of the method of the fifth aspect may comprise any example embodiment of the method of the sixth aspect.

According to a seventh aspect, computer program or a computer program product may comprise instructions configured to, when executed, cause an apparatus to perform any example embodiment of the method of the fourth, fifth and/or sixth aspect.

According to an eight aspect, an apparatus may be configured to perform any example embodiment of the method of the fourth, fifth and/or sixth aspect. The apparatus may for example comprise at least one processor, and at least one memory including program code, the at least one processor, and the program code configured to, when executed by the at least one processor, cause the apparatus to perform any example embodiment of the method of the fourth, fifth and/or sixth aspect.

According to a ninth aspect, a system may comprise: a plurality of hoists for operating a suspended load, wherein the plurality of hoists are coupled to a floating base comprising an exteroceptive observation system configured to measure a position or velocity of the suspended load with respect to a reference coordinate frame moving with the floating base, and wherein the floating base further comprises an inertial measurement unit configured to measure at least one inertial state of the floating base with respect to an inertial reference coordinate frame; means for performing position or velocity compensation for the suspended load based on the at least one inertial state of the floating base; means for determining a Cartesian space force or velocity for controlling movement of the suspended load; means for determining at least one first anti-sway control term based on a first neural network configured to take as input a height of the suspended payload from ground and a mass of the suspended load; means for adjusting the Cartesian space force or velocity or the plurality of tension forces or torques based on the at least one first anti-sway control term and at least two velocities associated with the suspended load; means for mapping the adjusted Cartesian space force or velocity to a plurality of tension forces or torques for the plurality of hoists based on a multivariable mapping function; means for adjusting the plurality of tension forces or torques with at least one neutral element of the multivariate mapping function such that each of the plurality of tension forces or torques is above or equal to a threshold, wherein the adjustment of the at least one neutral element does not change the mapping of the adjusted Cartesian space force or velocity to the plurality of tension forces or torques; and means for applying the plurality of tension forces or torques to the plurality of hoists to control the movement of the suspended load.

Any example embodiment of the above described aspects may be combined with one or more other example embodiments of the same or other aspect(s). However, the different aspects may be also embodied separately. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Example embodiments of the present disclosure relate to motion control of a target such as a suspended load. The example embodiments enable improving control performance in load handling machines. Even though some example embodiments have been described with reference to yard cranes such as for example automatic stacking cranes (ASC) or rubber-tyred gantry cranes (RTG), it is appreciated that the example embodiments may be applied in any type of load handling machines having non-rigid structures, for example other type of cranes. Other examples of such load-handling machines include rail-mounted gantry cranes (RMG), ship-to-shore (STS) cranes, or the like.

Figure 1:
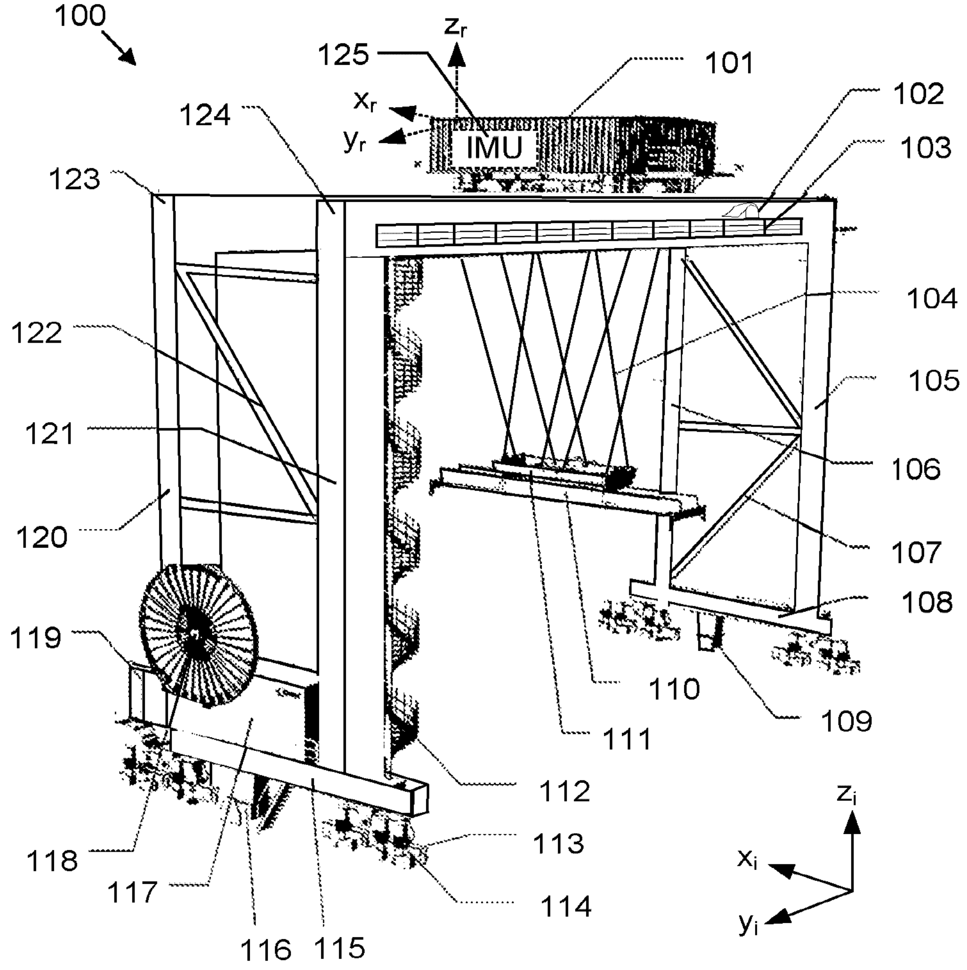
FIG. 1 illustrates an example of an automatic stacking crane (ASC), according to one or more example embodiments.

FIG. 1 illustrates an example of an automatic stacking crane (ASC), according to one or more example embodiments. The ASC 100 may be configured to handle a target (not shown), such as for example a cargo container. The ASC 100 may comprise one or more of the following parts: a trolley 101, a cable chain 102, a walkway 103, hoists 104 (e.g. ropes or cables), a first flexible leg (waterside) 105, a second flexible leg (landside) 106, tie(s) 107, a first sillbeam (flexible side) 108, a first stormbrake 109, a spreader 110, a headblock 111, stairs 112, a bogie 113, a gantry motor 114, a second sillbeam (fixed side) 115, a second stormbrake 116, an electrical house (E-house) 117, a cable reel 118, a trafo house 119, a first fixed leg (landside) 120, a second fixed leg (waterside) 121, tie(s) 122, a first main girder (landside) 123, or a second main girder (waterside) 124. The trolley 101 may be movable along the main girders 123, 124 of the ASC 100. However, in alternative arrangements a trolley could be movable along a single girder of a crane. The hoists 104 may be attached to the trolley 101 and therefore moving the trolley along the main girders 123, 124 may cause the hoists 104, and thereby a target held by the spreader, to move with respect to ground, that is, with respect to an y-axis of an inertial reference coordinate frame ($x_i$, $y_i$, $z_i$). The target may be for example a suspended load, which may be configured to hang stationarily or be manipulated in the air by tension forces of the hoists 104.

The trolley 101 may further comprise a load position measurement system (LPMS, not shown), for example a camera, a laser, or other sensor(s), configured to track movement, for example position and/or velocity, of the spreader 110, the headblock 111, and/or the target. The LPMS may however operate with respect to a reference coordinate frame ($x_r$, $y_r$, $z_r$) moving with the trolley 101. The reference coordinate frame ($x_r$, $y_r$, $z_r$) may be thus locked to the trolley 101 (floating base). It is noted that external disturbances such as flexing of different structures of the ASC 100 may cause external disturbances to the LPMS system. The LPMS is therefore an example of an exteroceptive observation system. Another example of an exteroceptive observation system is a target position measurement system (TPMS). The TPMS may be configured to measure a target position, such as for example position of a container or a trailer. A target position may comprise a position from which a load is to be lifted or to which a load is to be released. For example, the TPMS may be configured to measure a position of a target container on which a currently operated container is to be released. The trolley 101 is an example of a floating base that is susceptible to external disturbances that cause unintentional movement of the floating base with respect to the inertial reference coordinate frame ($x_i$, $y_i$, $z_i$). In case of a crane which does not comprise a trolley, e.g. the hoists 104 being attached directly to the girder(s) 123, 124, the floating base may comprise at least one girder of the crane.

To enable position and/or velocity compensation of signals provided by the LPMS, the trolley 101, or in general the floating base, may comprise an inertial measurement unit (IMU) 125. The IMU 125 may be fixedly coupled to the trolley 101 (floating base). The IMU 125 may comprise circuitry for measuring at least one inertial state of the IMU 125. The IMU 125 may measure an inertial state of the trolley 101 with respect to the inertial reference coordinate frame ($x_i$, $y_i$, $z_i$), e.g. the ground. The IMU 125 may for example comprise a linear accelerometer rigidly attached to the trolley 101. One sensitive axis of the accelerometer may be parallel to the motion of the trolley in the y-direction. The inertial state may therefore comprise acceleration of the trolley, for example with respect to the y-direction (substantially parallel to the girder(s) 123, 124).

Due to flexing of the ASC 100, the LPMS may indicate the target to be moving even if the target were actually stationary with respect to the ground. Similar errors may be superimposed to the LPMS output when the target is intentionally moved. This degrades the control performance. The IMU 125 enables to compensate for the external disturbances superimposed to LPMS signals due to flexing of various structures of the ASC 100, as will be further described below.

Figure 2:
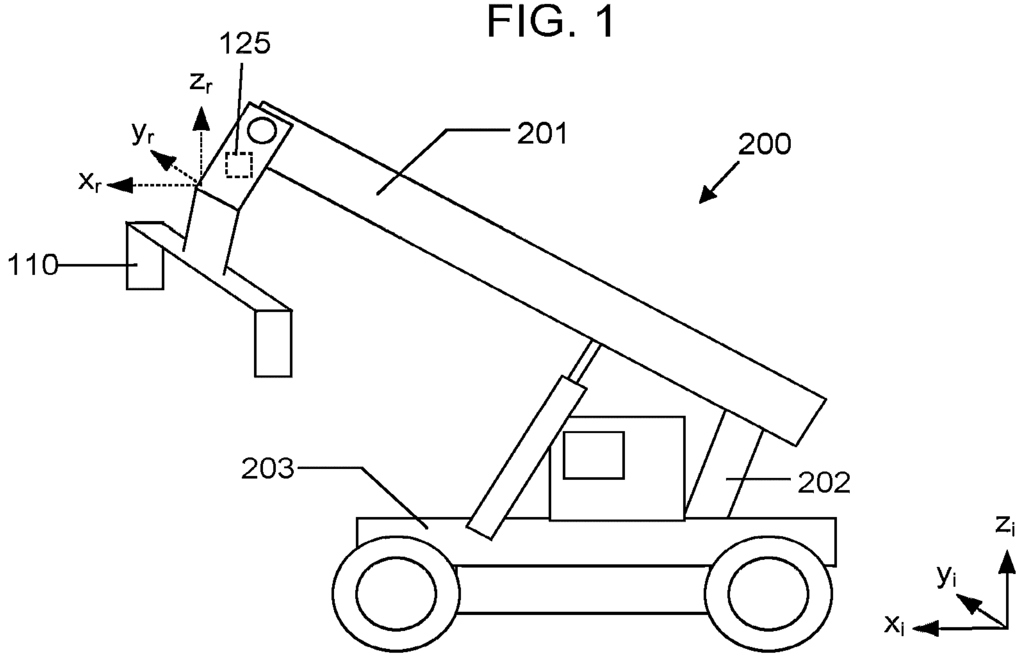
FIG. 2 illustrates an example of a reach stacker, according to one or more example embodiments.

FIG. 2 illustrates an example of a reach stacker, according to one or more example embodiments. The reach stacker 200 may comprise a boom 201 formed by one or more parts. The boom 201 may be configured to hoist or manipulate a target (not shown). The boom 201 may comprise the IMU 125. Alternatively, the IMU 125 may be located at the main body 203 of the reach stacker 200. Again, the IMU 125 may be configured to track movement of the boom 201 with respect to the inertial reference coordinate frame ($x_i$, $y_i$, $z_i$), for example the ground. The boom 201 may be susceptible to external disturbances such as flexing caused by wind or rapid movements of the boom 201 and therefore the boom 201 is provided as another example of a floating base. The information obtained by the IMU 125 may be again used to compensate external disturbances superimposed on measurement of an exteroceptive observation system configured to track movement of the spreader 110 and/or a target associated therewith and/or a target position, such as for example position of a container or a trailer. The exteroceptive observation system may be located at any suitable place on the reach stacker 200, for example on the boom 201, the main body 203, or the body link 202. The exteroceptive observation system, for example LPMS or TPMS, may comprise for example a camera or a laser sensor configured to track the spreader 110, a load, and/or a target position. It is noted that the ASC 100 and the reach stacker 200 are provided as examples of floating base machines, where the example embodiments of the present disclosure may be applied. The example embodiments may be however applied at various other type of machines, for example machines comprising a hoisting arrangement similar to the ASC 100. Examples of such machines include the RTG 900 of FIG. 9. The example embodiments may be also applied to any load handling machine comprising a boom similar to the reach stacker 200 as the floating base, for example any other type of crane.

Figure 3:
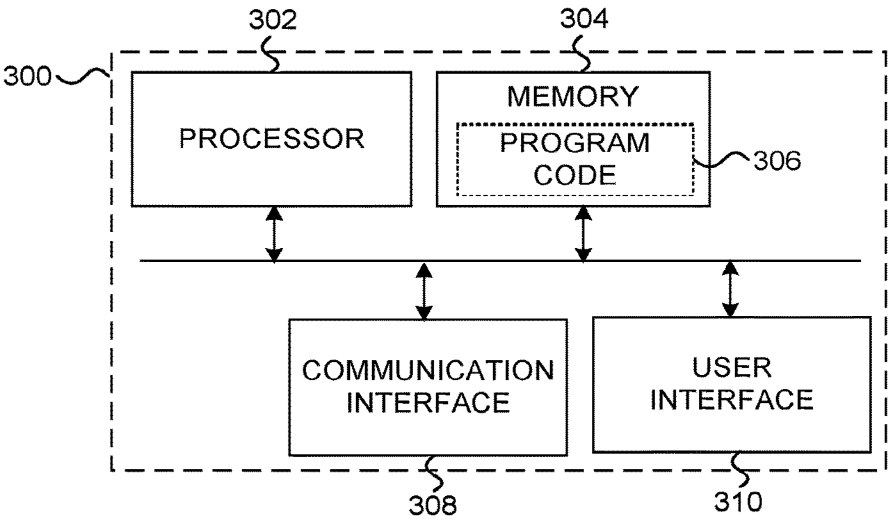
FIG. 3 illustrates an example of an apparatus configured to practice one or more example embodiments.

FIG. 3 illustrates an example of an apparatus configured to practice one or more example embodiments. The apparatus 300, for example a load handling machine or component(s) thereof, may comprise at least one processor 302. The at least one processor 302 may comprise, for example, one or more of various processing devices or processor circuitry, such as for example a co-processor, a microprocessor, a controller, a programmable logic controller (PLC), a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware (HW) accelerator, a special-purpose computer chip, or the like.

The apparatus 300 may further comprise at least one memory 304. The at least one memory 304 may be configured to store, for example, computer program code or the like, for example operating system software and application software. The at least one memory 304 may comprise one or more volatile memory devices, one or more non-volatile memory devices, and/or a combination thereof. For example, the at least one memory 304 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 300 may further comprise a communication interface 308 configured to enable apparatus 300 to transmit and/or receive information to/from other devices. In one example, apparatus 300 may receive signals from the IMU 125 and/or the LPMS, which may be integrated within the apparatus 300 or be external to the apparatus 300 The communication interface may be configured to provide at least one wireless radio connection or a wired connection. The apparatus 300 may further comprise a user interface 310. The user interface 310 may comprise an input device, for example to receive user inputs indicative of desired movements of the target(s). The user interface 310 may also comprise an output device, for example to provide various control information to the user. The input device may take various forms such a wheel, a control stick, a keyboard, a touch screen, one or more embedded control buttons, or the like. The output device may for example comprise a display, a speaker, or the like.

When the apparatus 300 is configured to implement some functionality, some component and/or components of the apparatus 300, such as for example the at least one processor 302 and/or the at least one memory 304, may be configured to implement this functionality. Furthermore, when the at least one processor 302 is configured to implement some functionality, this functionality may be implemented using the program code 306 comprised, for example, in the at least one memory 304.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The apparatus 300 comprises means for performing at least one example embodiment described herein. In one example, the means comprises the at least one processor 302, the at least one memory 304 including program code 306 configured to, when executed by the at least one processor, cause the apparatus 300 to perform the example embodiment(s).

The apparatus 300 may comprise for example a load handling machine such as for example a yard crane, an ASC, an RTG, a reach stacker, a straddle carrier, an overhead crane, other type of crane, or the like. The apparatus 300 may alternatively comprise a component or a subsystem of, or associated with, any such machine. Even though the apparatus 300 is illustrated as a single apparatus it is appreciated that, wherever applicable, functions of the apparatus 300 may be distributed to a plurality of apparatuses, for example to implement example embodiments as a cloud computing service.

Figure 4:
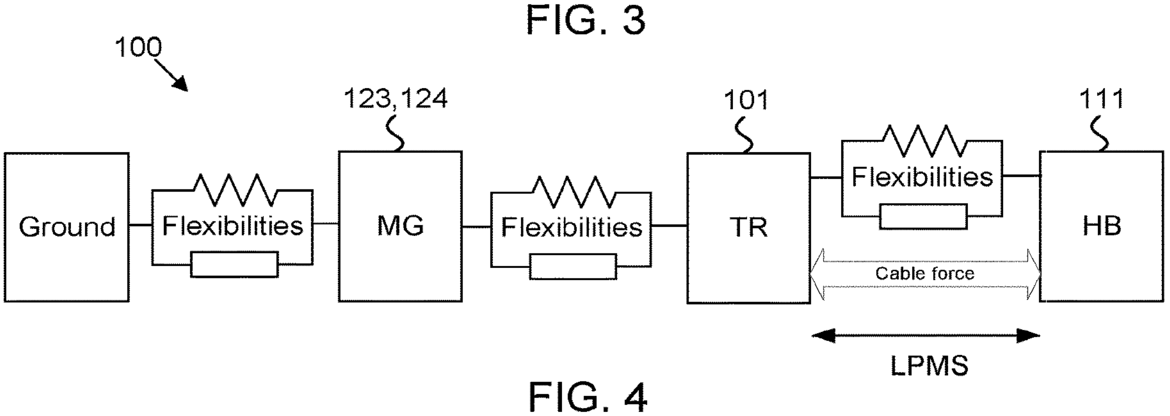
FIG. 4 illustrates an example of a spring system model of a flexing crane, according to one or more example embodiments.

FIG. 4 illustrates an example of a spring system model of a flexing crane, according to one or more example embodiments. The spring model system is described with reference to the ASC 100. However, similar spring model could be provided for other types of load handling machines as well. Flexing of the ASC 100 may be modeled for example by defining flexibilities between the ground and the main girder(s) (MG) 123, 124, between the main girder(s) 123, 124 and the trolley (TR) 101, and/or between the trolley 101 and the headblock (HB) 111. Between the trolley 101 and the headblock 111, the tension forces of the hoists 104 enable controlling movement of the headblock 111 and thereby also the spreader 110 and the target. It has been observed that cyclic portal flexing of a crane may range for example from a few centimetres to tens of centimetres. The portal flexing may be therefore significant, for example in comparison to a container positioning target of ±5 cm. Furthermore, the flexing may take place at the control band of the winches configured to generate the tension forces of the hoists 104. Because the flexing may have similar spectral characteristics as the container motions tracked by the LPMS, delay-introducing filtering (e.g. low/high/band pass) may not provide a sufficient solution for all use cases. Such filtering approaches could even degrade control performance in dynamic operating conditions.

Figure 5:
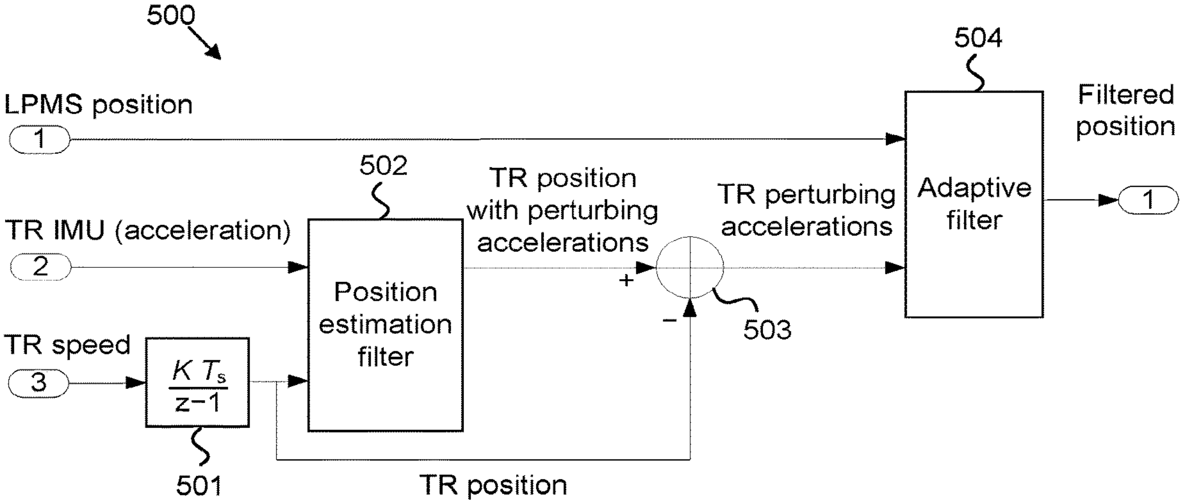
FIG. 5 illustrates an example of a block diagram for dynamic flex compensation, according to one or more example embodiments.

FIG. 5 illustrates an example of a block diagram for dynamic flex compensation, according to one or more example embodiments. The dynamic flex compensation system 500 may receive a first input signal, represented in the example of FIG. 5 by an LPMS position signal, indicative of the position of the target. In general, the first signal may comprise a signal received from an observation system configured to measure a position or velocity of the target with respect to the reference coordinate frame ($x_r$, $y_r$, $z_r$) moving with the observation system. The observation system may be located at a floating base. Hence, the observation system may be an exteroceptive observation system, which may be susceptible to external forces affecting movement of the observation system. The reference coordinate frame ($x_r$, $y_r$, $z_r$) may move with the floating base. The reference coordinate frame ($x_r$, $y_r$, $z_r$) may be stationary with respect to the floating base and/or the observation system.

A second input signal may be received from the IMU 125, which may be configured to measure an inertial state of the floating base with respect to the inertial reference coordinate frame ($x_i$, $y_i$, $z_i$). In this example, the second input signal comprises acceleration of the trolley (TR) 101. In general, the flex compensation system 500 may perform position or velocity compensation for the target based on the inertial state of the floating base. The position or velocity compensation may be based on statistical inference on the measured position or velocity of the target and the inertial state of the floating base. The statistical inference may comprise sensor fusion of the measured position or velocity of the target and the inertial state of the floating base. The system may be however extended to provide similar operations for a plurality of targets. Furthermore, the compensation may be based on measuring a plurality of inertial states of the floating base, for example accelerations with respect to a plurality of axes of the inertial reference coordinate frame ($x_i$, $y_i$, $z_i$). Hence, multi-dimensional position or velocity compensation may be performed.

When the dynamic flex compensation is applied to the ASC 100, an RTG, or other type of crane comprising a trolley movable along at least one girder, the flex compensation system 500 may further receive a third input signal indicative of the position of the trolley 101 with respect to the girder of the crane. The third signal may for example comprise a speed of the trolley with respect to the girder. The position of the trolley with respect to the girder may be then determined based on the speed of the trolley 101, for example using the discrete-time integrator 501 ($KT_s/(z-1)$). The position or velocity compensation for the target may be then performed based on the position of the trolley 101 with respect to the girder. Both the position of the trolley 101 and the IMU signal (signal "2") may be sampled at a sufficiently high and synchronized sample rate.

The position and acceleration of the trolley 101 may be fused with a position estimation filter 502, for example a Kalman filter. The output of the position estimation filter 502 may comprise the position of the trolley (TR) with perturbing accelerations, for example the displacement caused by the geometry changes in the y-direction with respect to the force of gravity. Hence, the output signal of the position estimation filter 502 may comprise the position of the trolley 101 with the portal flexing superimposed.

In case of a Kalman filter, the n-th output sample $\hat{x}_n$ of the positioning estimation filter 502 may be determined based on $$\hat{x}_n = \begin{bmatrix} 1 & T \\ 0 & 1 \end{bmatrix} \hat{x}_{n-1} + \begin{bmatrix} 1 & T/2 \\ 0 & 1 \end{bmatrix} kT\Delta x_{n-1} + \begin{bmatrix} T/2 \\ 1 \end{bmatrix} kT\Delta v_{x_{n-1}},$$

where $\hat{x}_{n-1}$ is the previous output sample of the positioning estimation filter 502, k is a constant, T is the sampling interval, $\Delta x_{n-1}$ is the change of the position of the trolley 101, and $\Delta v_{x_{n-1}}$ is the previous output of the inertial measurement unit 125, in the example of FIG. 5 the acceleration of the trolley 101. It is however possible to replace the stationary Kalman filter described above with a Kalman filter variant or a particle filter.

The displacement caused by the trolley motions and portal flexing (TR perturbing accelerations) may be extracted from the position estimation filter output, for example by subtracting the position of the trolley from the output of the position estimation filter 502. The subtraction may be implemented for example by adder 503 with one input inverted.

This improves motion control, since without any compensation the LPMS may erroneously interpret the trolley motions, wheel/portal flexing, or the like, to indicate that the target is swaying.

The obtained signal may be provided as an error signal to an adaptive filter 504, for example a recursive least squares (RLS) filter. The measured position or velocity of the target may be filtered with the adaptive filter 504 to perform the position or velocity compensation. The displacements may be therefore passed through the adaptive filter 504, which may adjust the displacements with an optimization algorithm to match the error amplitude and phase characteristics in the LPMS readings, for example in the y-direction. In this way, any motion controller (e.g. anti-sway controller) relying on the LPMS readings receives high bandwidth feedback without error modes caused by cyclic structural changes or flexing of the floating base. For example, since the IMU 125 on the trolley 101 is referenced to the force of gravity (inertial reference coordinate frame), the IMU 125 may sense both accelerations of the trolley and those caused by the cyclic structural changes. This information is then advantageously used to rectify the LPMS signal. Anti-sway control may be alternatively called active oscillation damping.

In case of RLS, the adaptive filter 504 may be implemented based on the following procedure:
Initialization:

$$w = 0$$

$$P = \delta^{-1} I,$$

where vector ŵ comprises the adaptive weights of the filter, δ is a positive constant, and I is the identity matrix. The order of the filter may be for example eight.
For each time instant n=1, 2 . . . , compute:

$$\pi(n) = P(n-1)u(n),$$

$$k(n) = \frac{\pi(n)}{\lambda + u^H \pi(n)},$$

$$\hat{w}(n) = \hat{w}(n-1) + k(n)\xi*(n) \text{ and}$$

$$P(n) = \lambda^{-1} P(n-1) - \lambda^{-1} k(n) u^H (n) P(n-1),$$

where u(n) is the input of the adaptive filter, in the example of FIG. 5 a vector of LPMS position samples, ξ*(n) is a complex conjugate of the error signal, and λ is a constant, for example λ=0.99. Another adaptive filter, or a neural network, may be however used instead of the RLS algorithm.

The example embodiment(s) of FIG. 5 therefore provide a low-cost sensor fusion based approach for compensating errors in LPMS positioning readings. The errors may originate for example from elastic strains or reactive force exchanges between components that cause cyclic flexing. Such errors may be time-varying and dependent on the reduced masses of inertia on the winches in the trolley 101, the main girder(s) 123, 124, wheels, or the like. Compensating these errors enables to improve control performance of load handling machines. Because the errors superimposed on the LPMS readings may occupy the control band in the frequency domain, for example a combination of Kalman filtering and adaptive RLS filtering may be applied to implement a three-input error canceler.

Alternatively, the position (or velocity) and acceleration of the trolley 101 may be fused by a neural network. The neural network may take as input the position (or velocity) and acceleration of the trolley 101, for example similar to the position estimation filter 502. The neural network may be trained for example by providing sets of positions (or velocities) and accelerations of the trolley 101 as training data and using fusion results of a non-neural network based system (e.g. a Kalman filter) as ground-truth data. Similarly, another neural network may be used to perform position or velocity compensation for the target based on the measured position or velocity of the target the output of the position estimation filter 502 or a neural network replacing the position estimation filter 502.

Figure 6:
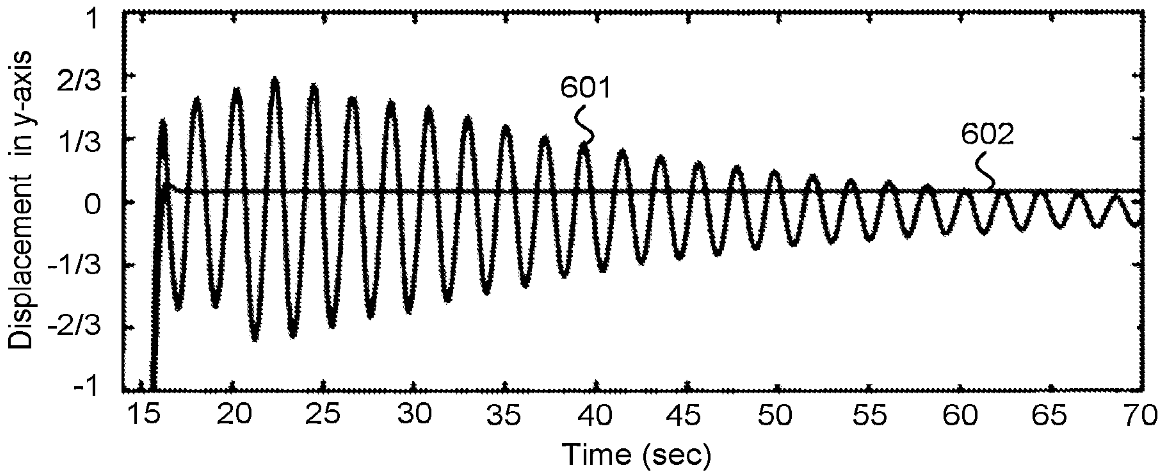
FIG. 6 illustrates an example of measured trolley movement with and without an inertial measurement unit (IMU) feedback, according to one or more example embodiments.

FIG. 6 illustrates an example of measured trolley movement with and without an inertial measurement unit (IMU) feedback, according to one or more example embodiments. The displacement in y-axis is provided in normalized distance units. The output of the position estimation filter 502 (Kalman filter in this example) that fuses the trolley position with the y-directional accelerations is illustrated by curve 601 as displacement with respect to the y-axis. The position as observed by the position sensors of the trolley 101 is illustrated by curve 602. Effectively, the position estimation filter 502 double integrates the accelerations of the trolley 101 in a drift-free manner and combines them with the trolley's internal motion state. This example measurement reveals flexibilities that are not observed by the position sensors of the trolley 101.

Figure 7:
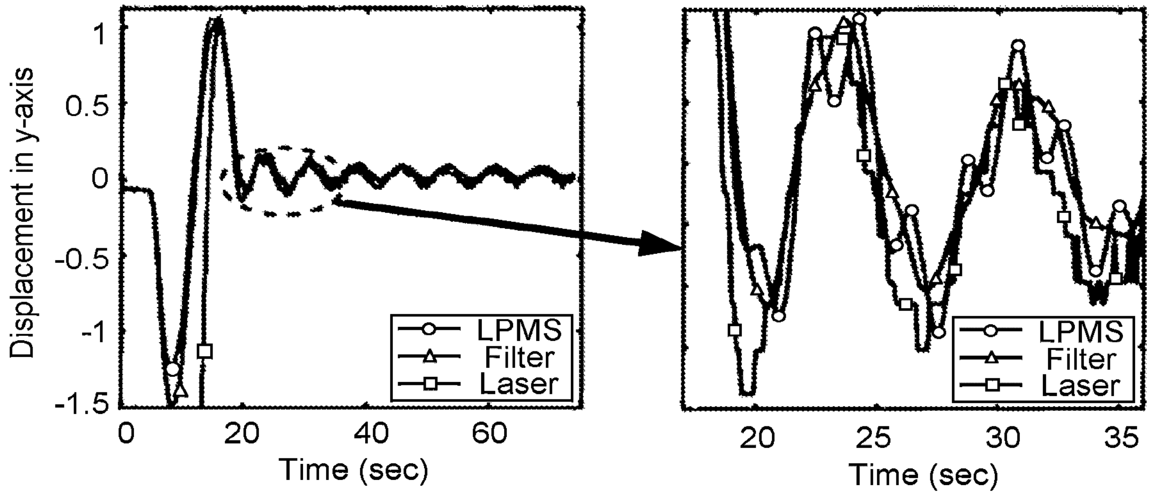
FIG. 7 illustrates an example of filtered and non-filtered load positioning measurement system (LPMS) signals, according to one or more example embodiments.
Figure 8:
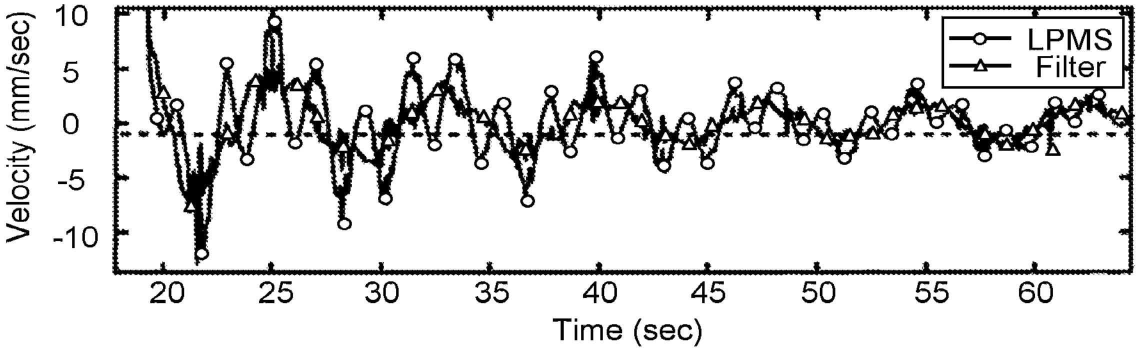
FIG. 8 illustrates another example of filtered and non-filtered load positioning measurement system (LPMS) signals, according to one or more example embodiments.

FIG. 7 and FIG. 8 illustrate examples of filtered and non-filtered load positioning measurement system (LPMS) signals, according to one or more example embodiments. FIG. 7 illustrates measured container displacement (y-axis) with respect to time (sec) for non-filtered LPMS (circles), filtered LPMS (triangles), and a laser sensor (squares) acting as an external stationary observer. The displacement in y-axis is again provided in normalized distance units. The right figure is a zoomed version of the left figure. FIG. 8 illustrates similarly the measured velocity (mm/sec) of a container. By comparing the non-filtered LPMS output to the output of the laser sensor, it is observed that the cyclic flexing results in an oscillating signal component superimposed on the LPMS output. Noteworthy, the derivative of the non-filtered LPMS output changes sign close to the natural frequencies of motion of the tested load handling machine (RTG). This may result in the winches of the RTG receiving erroneous control commands. The feedback may for example lead to a challenging situation, where the controller cannot guarantee cable pretension. Therefore, cable sagging and undesirable changes may happen in the angles between auxiliary ropes and the headblock which applies impulses and excites the container oscillations by the next change in the motion direction (e.g. loosening the auxiliary ropes or even producing a whiplash effect that shakes the portal). As can be seen from the figure, the disclosed dynamic flex compensation method resulting in the filtered LPMS readings suppresses this behaviour almost completely without introducing a delay. Motion control of a load handling machine may be then performed based on the position or velocity of the target, as provided by the filtered LPMS readings. Control performance of the system may be therefore greatly improved.

It may be challenging to design high-inertia yard cranes without non-plastic changes during operation. These phenomena may corrupt the LPMS readings, resulting in random, undesired winch actuation. The disclosed dynamic flex compensation method fuses the trolley's position with accelerations originating from time-varying changes of the crane geometry, which may be adjusted as described above. Therefore, faster oscillation damping is achieved, for example in case of large swaying (e.g. anti-sway control) or for fine positioning of the target. To estimate and compensate for flex-originating errors, the force of gravity may be referenced using the IMU 125 mounted on the trolley 101. The IMU 125 may comprise for example an inexpensive MEMS (microelectromechanical system) accelerometer. The disclosed approach may enable designing cranes with lighter material and therefore provide cost benefits. Furthermore, the disclosed on-board computations may be implemented without any changes or any significant changes to decentralized control solutions running on modern computing platforms. Furthermore, as noted above, the disclosed flex compensation method is not limited to considering oscillations in the y-direction (direction of the trolley's 101 movement). Alternatively, or additionally, similar approach may be applied to the x-direction (perpendicular to the y-direction). For example, an RTG may be movable in the x-direction. Extending the flex compensation to consider also the x-directional acceleration (measured by the IMU 125) enables x-directional perturbations, for example due to elastic changes excited by wheel braking, to be compensated. The TPMS system may also benefit from the disclosed solution.

Figure 9:
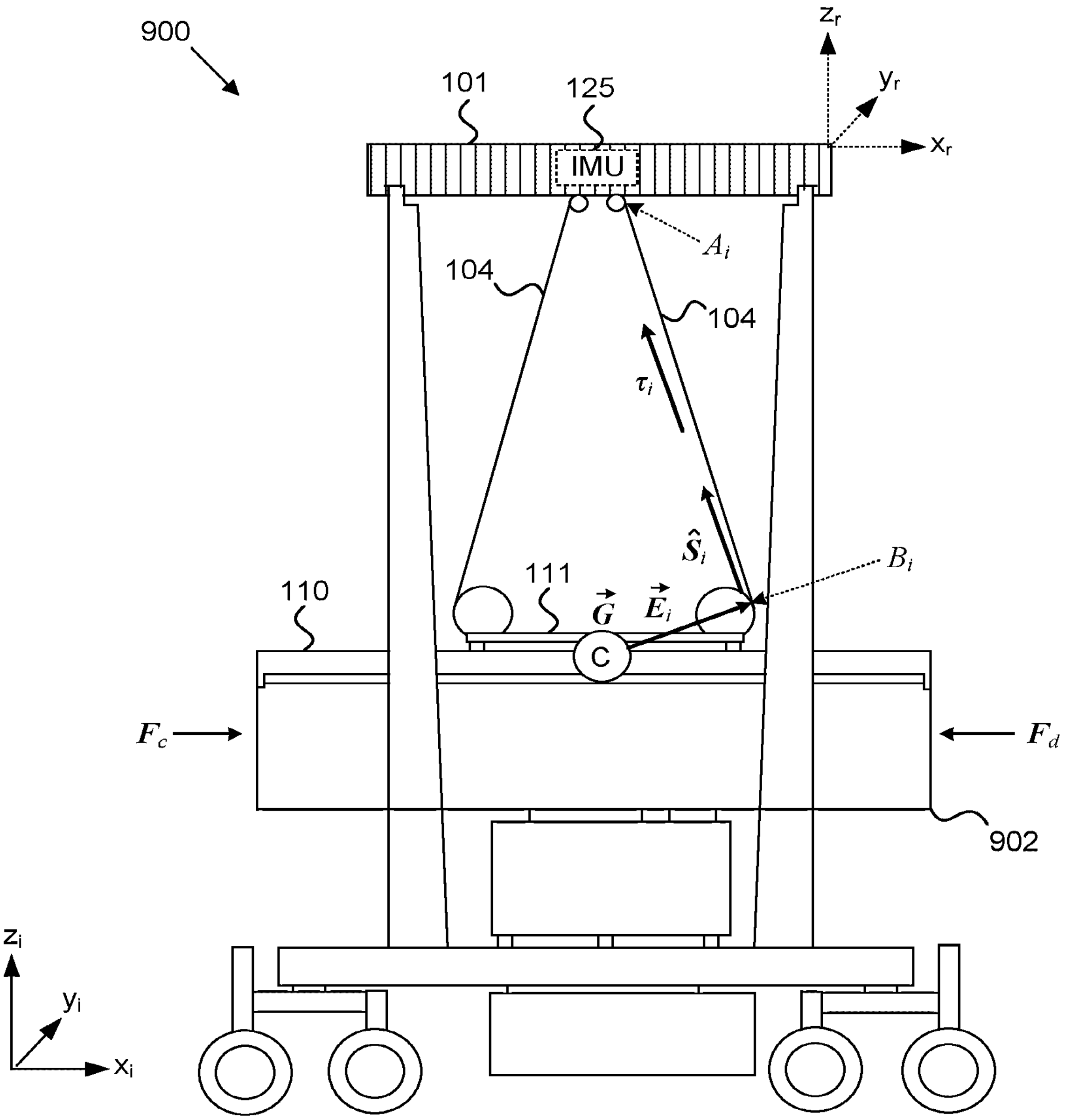
FIG. 9 illustrates an example of a rubber-tyred gantry crane (RTG), according to one or more example embodiments.

FIG. 9 illustrates an example of a rubber-tyred gantry crane (RTG), according to one or more example embodiments. Even though the RTG 900 is used as reference for describing the method for coordinated hoist control, the above disclosed example embodiments for performing dynamic flex compensation may be applied also to the RTG 900, either separately, or in combination with the coordinated hoist control approach disclosed herein. Therefore, the RTG 900 may comprise the IMU 125, for example rigidly mounted at a trolley of the RTG. Similar to the ASC 100, the trolley may be movable along girder(s) of the RTG. The coordinated hoist control solution may use the filtered LPMS readings, for which position or velocity compensation is performed based on inertial measurements obtained by the IMU 125. It is however noted that the coordinated hoist control solution may be applied without the IMU 125, e.g. using non-filtered LPMS signal as basis for the control operations described herein.

The RTG 900, or in general any suitable type of crane, may comprise hoists 104 for operating a suspended load, represented by the container 902. The hoists 104 may be coupled (e.g. fixedly) to the trolley 101 at respective connection points $A_i$. The hoists 104 may be coupled (e.g. fixedly) to the headblock 111 at respective connection points $B_i$. The headblock 111 may be configured to be attached to the container 902, for example by means of the spreader 110. The RTG 900 may be movable along direction x (gantry direction). The trolley 101 may be movable along the girder in the y-direction (trolley direction).

The coordinated hoist control method described herein provides force-torque mapping method for the hoists 104 and a related motion control topology based on it. The mapping may be used to enable Cartesian space motion control. For example, given a force affecting the spreader (e.g. owing to the container's interaction with the wind) the mapping produces a matching torque distribution for the hoists 104 based on locations of the connection points $B_i$ on the headblock 111 and connection points $A_i$ at the trolley 101. Because the physical placement of the connecting points $B_i$ on the headblock 111 may be tracked using the LPMS system, the maximum capabilities of the winches in the trolley 101 become available for controlling the spreader 110 at each point in the workspace. This means that the mapping is well-suited for example for user-assisting and anti-sway control development. Given a CAD (computer-aided design) model of the trolley 101 and headblock 111 with the arrangement of hoists 104 connecting them to each other, it is possible to extract part of the controller architecture which is dedicated for force or velocity mappings The (coordinated hoist) controller may command the system to move in the x- and/or y-directions, and/or to rotate around the z-axis (skew direction). This command may be then translated into the hoist coordinate space (e.g. joint space, cable space, rope space) based on the force mapping to determine the role of each cable for causing the desired force to be applied to the container 902. For example, hoisting inverters may use the mapped commands to work together with the hoisting mechanisms to create desired cable tension forces, which result in a force vector affecting the spreader 110 in the x-, y-, and/or skew directions. Therefore, a control engineer may not need to perform any on-site tuning of the axillary hoisting controllers for specific deployments. This provides significant improvement in engineering processes needed for deployment of manual and automatic RTGs by minimizing control tunings. In addition, backward compatibility to existing systems may be preserved.

In the example of FIG. 9, a wind disturbance force $F_d$ affects the container 902 from the right. A Cartesian space control force $F_c$ may be applied to the container 902 via the hoists 104 to cause desired movement of the container 902 or to keep the container stationary regardless of a wind disturbance force $F_d$ (anti-sway case).

The force-torque mapping may be performed by a multivariate mapping function determined based on the geometry of the system, extracted for example from the CAD model. A plurality of Cartesian unit vectors, $\hat{S}_i$, corresponding to directions of the hoists 104, may be defined. These unit vectors may have a length equal to one and a direction reflecting the direction of a respective hoist, i.e., the direction between respective connection points $A_i$ and $B_i$. The unit vectors may be determined dynamically based on the locations of the connection points ($A_i$,$B_i$) at any give time. For example, the location of the trolley 101 with respect to the girder(s) may be determined first and the locations of the connection points $A_i$ may be then determined based on the location of the trolley 101 with respect to the girder(s). Similarly, a location (including orientation) of the headblock 111 may be first determined (e.g. based on filtered or non-filtered LPMS readings) and the locations of the connection points $B_i$ may be then determined based on the location of the headblock 111. Furthermore, Cartesian torque arm vectors, $\vec{E}_i$, from a centre (C) of the headblock 111 to the connection points $B_i$ may be determined, for example based on the current location of the headblock 111. The tension forces (or torques) of the hoists 104 are denoted by $\tau_i$. A tension force vector may be defined as $\tau=[\tau_1, \tau_2, \ldots, \tau_N]^T$. The space defined by the tension forces $\tau_i$ of the hoists 104 may be called the hoist (coordinate) space.

According to an example embodiment, the multivariate mapping function may comprise a Jacobian matrix J, whose transpose $J^T$ may be given by $$J^T = \begin{bmatrix} \hat{S}_i & \ldots & \hat{S}_N \\ \vec{E}_1 \times \hat{S}_i & \ldots & \vec{E}_N \times \hat{S}_N \end{bmatrix},$$

where × denotes a cross product. The matrix $J^T$ may be therefore of size 6×N, where N≥4 is the number of the hoists 104. The tension forces (or torques) may satisfy the equation $F_c = J^T \tau$, where $F_c$ comprises the Cartesian force $F_c = [f_x, f_y, f_z, f_{rx}, f_{ry}, f_{rz}]^T$, where $f_x$, $f_y$, and $f_z$ are linear force components of the Cartesian space force with respect to axes x, y, and z, and where $f_{rx}$, $f_{ry}$, and $f_{rz}$ are the torque components of the Cartesian space force with respect to axes x, y, and z. The size 6×N may correspond to the general case of spatial motion with respect to any direction.

Figure 10:
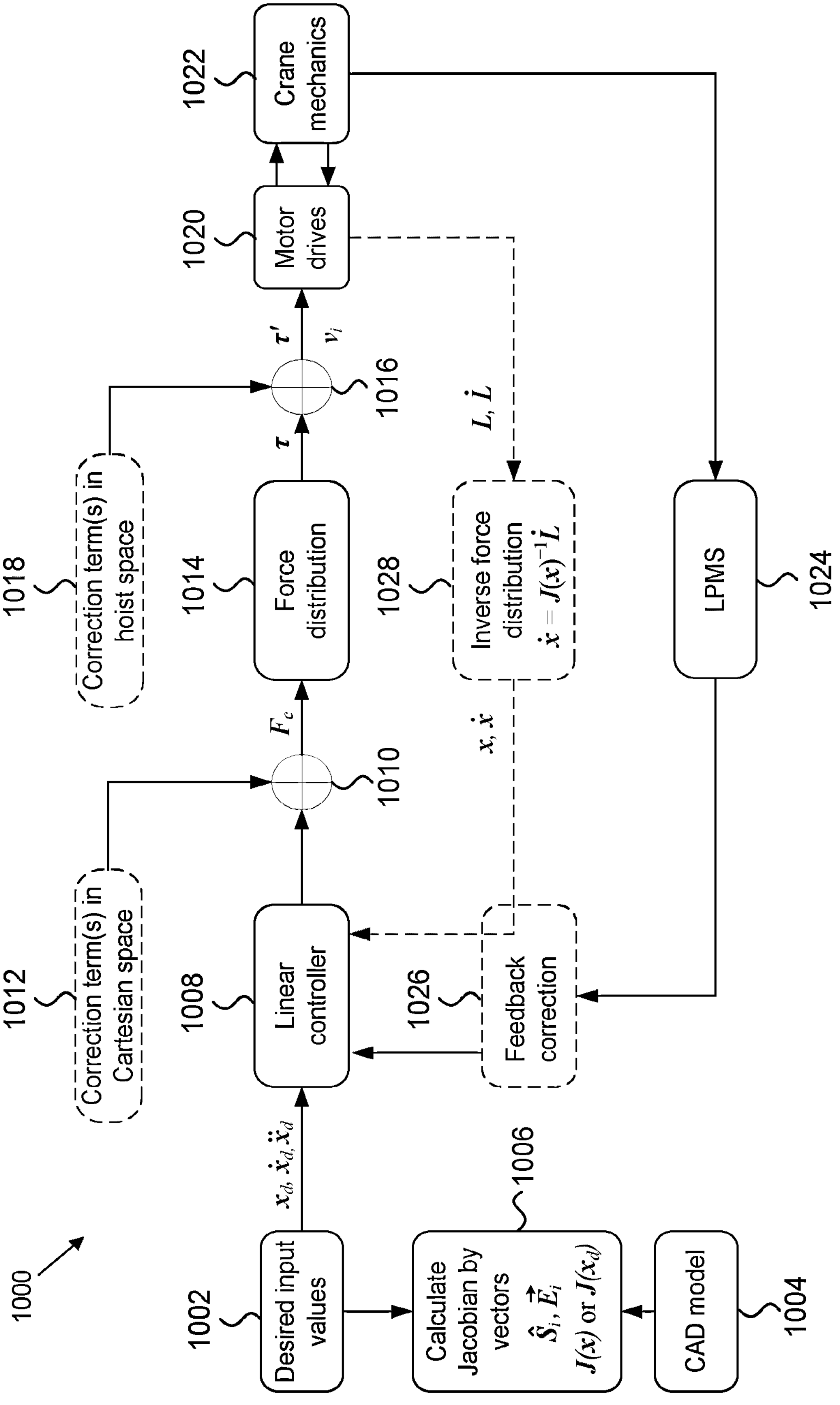
FIG. 10 illustrates an example of a control architecture for coordinated hoist control, according to one or more example embodiments.

FIG. 10 illustrates an example of a control architecture for coordinated hoist control, according to one or more example embodiments.

Input block 1002 of the coordinated hoist controller 1000 may obtain desired input value(s), for example $x_d$, $\dot{x}_d$, $\ddot{x}_d$, where, $\dot{x}_d$a, $\ddot{x}_d$ denote first and second derivatives of the desired headblock position or velocity $x_d$. The desired commands created by a human operator or an automation system may determine the desired motion of the container 902. The desired motion may be a changing input or a request for zero speed and zero acceleration.

The coordinated hoist controller 1000 may further comprise or have access to a CAD model 1004 of the RTG 900, or in general the crane in question. The CAD model 1004 may comprise information about the geometry of the crane, for example effective hoist attachment point positions on the trolley 101 and the headblock 111, for example with respect to their centroids. This information may be provided for various types of cranes and various (auxiliary) hoist designs. The information may be locally stored at the crane or it may be accessed remotely, for example downloaded from a server over a network connection, which may be provided for example by the communication interface 308.

A mapping function block 1006 may use the information provided by the CAD model 1004 to create the algebraic equations of the multivariate mapping function, e.g. the Jacobian. For example, the mapping function block 1006 may use the vectors of the attachment points and cable directions shown in FIG. 9 and create a multivariate mapping matrix, e.g., the Jacobian matrix J. The Cartesian space may be characterized by the six dimensions (x, y, z, rx, ry, rz). The hoist geometry may be defined based on the sets of connection points. As noted above, one set of connection points ($A_i$) may be stationary with respect to trolley 101. One set of connection points ($B_i$) may be attached to the moving headblock 111. Therefore, the set of connection points $A_i$ is obtainable from the CAD model 1002. Initial values of $B_i$ may be obtained from the CAD 1002 model as well, but at each control cycle they may be moved in accordance with the current headblock coordinates (generated by LPMS signal or desired values). As a result, sufficient approximation of the directions of the hoists may be maintained by dynamically updating the sets of connection points. The multivariate mapping may be then used for mapping of velocities, forces, and/or errors between the Cartesian and hoist spaces.

The linear controller 1008 may determine a Cartesian space force for controlling movement of the container 902. The linear controller 1008 may receive as input the desired input value(s) and feedback data indicative of at least movement of the container 902. For example, linear PD-control (proportional-derivative) with or without compensation of gravitational forces or existing hoisting forces may be applied. Even though the linear controller 1008 is described as providing a force as its output, the linear controller could be alternatively configured to provide a velocity as its output. Also other functions of the coordinated hoist controller 1000 may be configured to act on velocities instead of forces.

At block 1010, one or more Cartesian space correction terms 1012 may be applied to the output of the linear controller 1008 to obtain the Cartesian space force $F_c$ subject to the force-torque mapping at the force distribution block 1014. The Cartesian space correction term(s) 1012 may be applied for example by adding them to the output of the linear controller and/or by multiplying the output of the linear controller 1008 with the correction term(s). The Cartesian space correction term(s) 1012 could be generated for example with a neural network, as will be further described below.

The force distribution block 1014 may map the Cartesian space force $F_c$ to tension forces or torques for the hoists 104 based on the multivariable mapping function. The resulting tension forces or torques may be however adjusted with at least one neutral element of the multivariate mapping function such that each of the tension forces or torques is above or equal to a threshold. This enables to avoid hoist sagging or slack and therefore to ensure that the system can be controlled based on the assumption of having rigid hoists 104. A neutral element of the multivariate mapping function may be an element whose adjustment does not change the mapping of the Cartesian space force $F_c$ to the tension forces or torques of the hoists 104. For example, the neutral elements may be within a null-space of a subset of the Jacobian matrix J, as will be further described below.

For example, assuming the number of hoists 104 is four, the force distribution block 1014 may apply the latest generated 4×6 Jacobian matrix (J4×6). Herein, the 6D space may include linear velocity directions (vx, vy, vz) and angular velocity directions (wx, wy, wz). However, if the desired movement of the container 902 is limited to planar movement and rotation, only a subset of components of the 6D space may be relevant. For example, if the linear controller 1008 is configured to control planar movement of the container 902 with respect to ground (e.g. x- and y-axes of the inertial reference coordinate frame) and planar rotation around the vertical axis (z), only the components x (gantry direction), y (trolley direction) and rz (rotation about vertical axis) may be relevant for the linear controller 1008. Therefore, the matrix J4×6 may be reduced to cover only planar motion, which results in a 4×3 Jacobian matrix (J4×3). This introduces one degree of redundancy for inverting the Jacobian with a possibility of optimization of the tension forces (motor torques) based on the null-space of the matrix J4×3. Therefore, the multivariable mapping function may comprise a subset (e.g. J4×3) of the Jacobian matrix (e.g. J4×6). The neutral element(s) may be within the null space of the subset of the Jacobian matrix. The subset of the Jacobian matrix may be determined by selecting columns of the Jacobian matrix corresponding to the linear force components of the Cartesian space force for the x-axis and the y-axis and a torque component of the Cartesian space force for the z-axis. Given a minimum tension force $\tau_0$, an algebraic optimization method may be used to guarantee a minimum tension while mapping the Cartesian space force $F_c$ from the Cartesian space into the hoist space. The value of $\tau_0$ may be determined for example based on mechanical limitations (cable sagging/slack) or based on requirements of the hoisting mechanism. In the general case of N hoists, the size of the subset of the Jacobian matrix, corresponding to selected directions, for example planar motion, may be 3×N. An example of dimension reduction is selecting the planar elements (x, y, skew) of the, reducing the dimensions to 3×N, as described above.

The force distribution block 1014 may act as a border line between the Cartesian space and the hoist space. Before the force distribution block 1014, Cartesian space control terms associated with the container 902, the spreader 110, the headblock 111, or the trolley 101 may be applied at block 1010. After the force distribution block 1014, one or more hoists space correction terms 1018 may be applied at block 1016. The hoist space correction term(s) 1018 may be applied for example by adding them to the output of the force distribution block 1014 (output of the multivariate mapping function) and/or by multiplying the output of the force distribution block 1014 with the correction term(s) 1018. This enables control and/or estimation terms associated with the hoists 104, motor drives, or pulleys to be applied at the hoist space. For example, if the wind blows towards the trolley direction, the force distribution block 1014 may convert the wind force into the hoist space to determine how much the wind force affects each hoist. The motor drives 1020 may be used to apply the determined tension forces or torques to the hoists 104. Reverse use of the force distribution block 1014 enables to identify the result of applying particular cable tension forces. For example, it is possible to determine how much pulling each hoist by a certain tension force in a given position affects the main hoisting direction. Another benefit of the force distribution block is the possibility of using it to check feasibility of the crane design based on analysis of the null-space component signs.

It may be in general desired to apply the corrections as soon as the system acquires information about the need for such compensation. Therefore, correction terms may be applied either at the Cartesian space or the hoist space, or both. For example, referring to the Newton's law, F=ma, if it is desired to cause a 2 $m/s^2$ acceleration in the trolley direction for a 40-ton container, it is a safe assumption that at least 800 000 N force is necessary. This force value may be used as the correction term in the Cartesian space. Then, it is possible to use the first column of the Jacobian matrix to make an equilibrium and solve how much would be the share of the first hoist in the required force. The obtained value may be applied as a correction term in the hoist space. The feedforward correction term(s) may therefore improve the behaviour by consideration of known dynamics. Alternatively, an artificial intelligence (AI) algorithm such as for example a neural network may learn from the crane behaviour to create such correction terms(s). For example, model-based nonlinear control, feedback linearization, torque compensation, or inverse dynamic control are possible approaches to be deployed on the illustrated blocks as correction terms.

The LPMS 1024 may track at least movement of the container 902 affected for example by the motor drives 1020 (e.g. winches coupled to the hoists 104) or in general movement of the crane mechanics 1022. The LPMS 1024 may provide feedback indicative of at least the movement of the container 902 to the linear controller 1008.

Optionally, at feedback correction block 1026, one or more corrections may be applied to the LPMS signals. In yard cranes it may be desired to detect and control motion of its payload, e.g. the container 902. A human operator, or an automation system, should be enabled to deliver accurate motion control in the inertial reference coordinate frame and with respect to a viewpoint of an external observer. It may be therefore desired to correct the internal dynamics, sensor inaccuracy, actuator backlash, tyre flexibility, and their non-linearities without significantly affecting the trajectory of the container 902. These non-linearities may be corrected within the feedback correction block 1026, before passing the LPMS signals into the linear controller 1008. For example, the dynamic flex compensation system 500 could be implemented as a feedback correction algorithm at the feedback correction block 1026. Similarly, results of camera-based motion control can be utilized within the coordinated hoist control architecture as feedback correction.

The coordinated hoist controller 1000 may further comprise an inverse force distribution block 1028. At the force distribution block 1014, the Jacobian matrix may be exploited for mapping of forces to torques. There are however considerable potentials in using the Jacobian in mapping velocities. For example, instead of the feedback from the LPMS 1024, the headblock velocity may be obtained by an inverse Jacobian-based mapping of winch velocities. The inverse force distribution block 1028 may for example receive as input a winch velocity vector $\dot{L}$ and apply an inverse Jacobian mapping to derive the headblock velocity by $\dot{x}=J(x)^{-1}\dot{L}$.

In general, the inverse force distribution block 1028 may determine hoist feedback data based on applying an inverse of the multivariate mapping function of the force distribution block 1014 to hoist space measurement data associated with the hoists 104. The hoist space measurement data may comprise for example winch velocities, winch positions, winch torques, or errors associated with the hoists 104. The linear controller 1008 may control the movement of the container 902 based on the hoist feedback data. Feedback correction(s) may be optionally applied also to the hoist feedback data. The inverse force distribution 1028 may be used for example to provide coarse position or velocity feedback. The system could be then augmented by other means, for example with a vision system, to provide finer resolution. If the inverse force distribution is based on the Jacobian mapping determined based the hoisting structure, even a low accuracy feedback may not cause any stability issues.

Figure 11:
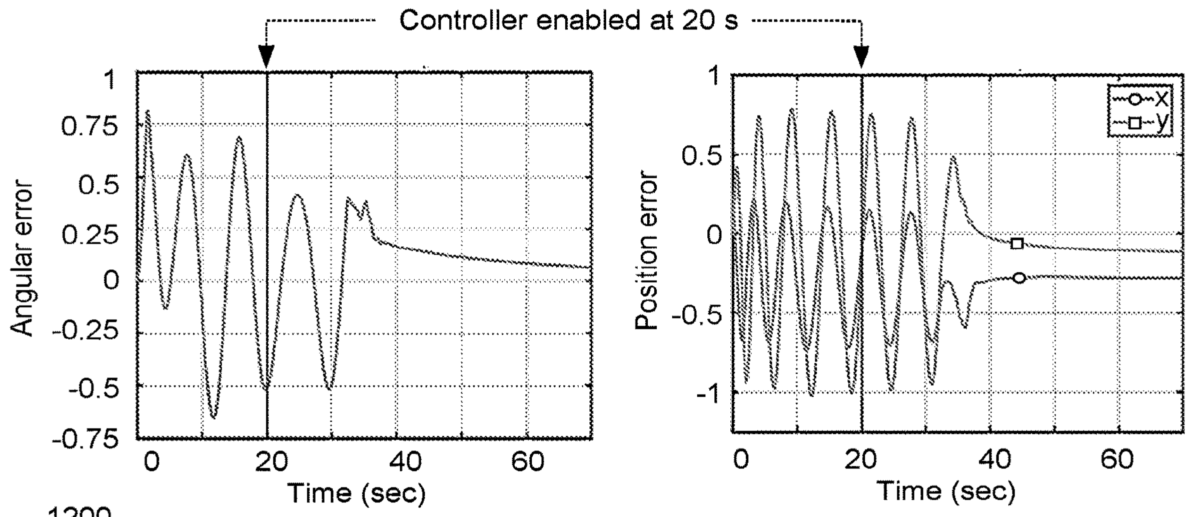
FIG. 11 illustrates an example of performance of a coordinated hoist controller, according to one or more example embodiments.

FIG. 11 illustrates an example of performance of a coordinated hoist controller, according to one or more example embodiments. The left figure illustrates the angular error in normalized angular units and the right figure illustrates the x-position error (circles) and y-position error (squares) in normalized distance units. The coordinated hoist controller 1000 is enabled at t=20 s. It is observed that the coordinated hoist controller 1000 manages to damp the oscillations in less than 20 seconds. The coordinated hoist controller 1000 comprising the mapping of forces/velocities of the Cartesian space to tension forces/torques of the hoist space therefore provides an efficient solution for motion control of the container 902.

Figure 12:
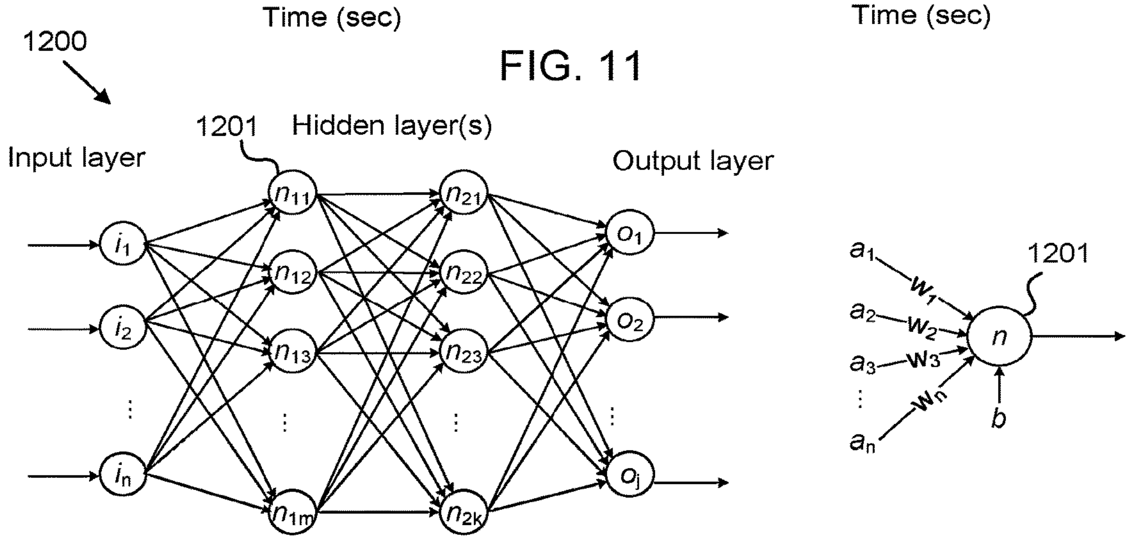
FIG. 12 illustrates an example of a neural network for motion control of a suspended load, according to one or more example embodiments.

FIG. 12 illustrates an example of a neural network, according to one or more example embodiments. The neural network 1200 may be configured (by training) to perform a particular task, for example to perform sensor fusion as the positioning filter 502 as part of the dynamic flex compensation system 500 or to generate Cartesian or hoist space correction terms for a linear controller, for example within the coordinated hoist controller 1000. The neural network 1200 is provided as an example of a AI algorithm. Any suitable AI algorithm may be however used instead. The neural network 1200 may comprise an input layer, one or more hidden layers, and an output layer. Nodes of the input layer, $i_1$ to $i_n$, may be connected to one or more of the m nodes of the first hidden layer, $n_{11}$ to $n_{1m}$. Nodes of the first hidden layer may be connected to one or more of the k nodes of the second hidden layer, $n_{21}$ to $n_{2k}$. It is appreciated that even though the example neural network of FIG. 12 illustrates two hidden layers, a neural network may apply any number and any type of hidden layers. Neural network 1200 may further comprise an output layer. Nodes of the last hidden layer may be connected to one or more nodes of the output layer, $o_1$ to $o_j$. It is noted that the number of nodes may be different for each layer of the network. A node may be also referred to as a neuron, a computation unit, or an elementary computation unit. One or more of the layers may be fully connected layers, for example layers where each node is connected to every node of a previous layer. Each layer may take input from one or more previous layers and provide its output as the input for one or more of the subsequent layers. Nodes of certain layer may take input from nodes of one or more of preceding layers and provide output to one or more of following layers. Nodes may also receive feedback from one or more of the subsequent layers.

Each node 1201 may be configured to receive one or more inputs, $a_1$ to $a_n$, from one or more nodes of one or more previous layers and compute an output based on the input values received. Inputs may be associated with parameters to adjust the influence of a particular input to the output. For example weights $w_1$ to $w_n$ associated with the inputs $a_1$ to $a_n$ may be used to multiply the input values $a_1$ to $a_n$. The node 1201 may be further configured to combine the inputs to an output, or an activation. For example, the node 1201 may be configured to sum the modified input values. A bias or offset b may be also applied to add a constant to the combination of modified inputs. Weights and biases may be trainable parameters. For example, when the neural network is trained for a particular task, the values of the weights and/or biases associated with different inputs and different nodes may be updated such that an error associated with performing the task is reduced to an acceptable level. Furthermore, an activation function $f$ may be applied to control when and how the node 1201 provides the output. As an example, the neural network 1200 may comprise a fully-connected neural network with four hidden layers, each hidden layer having 128 nodes. The activation function of the nodes 1201 may comprise a ReLU (rectified linear unit) function.

Feeding a set of input data through the layers of the neural network 1200 to produce an output may be called forward propagation. During this process the weights and biases of the neural network 1200 affect the activations of individual nodes and thereby the output provided by the output layer. As noted above, the neural network 1200 may be trained to produce a desired output for certain (unseen) input data. During training the properties (e.g. weights) of the neural network may be changed such that its output becomes as close as possible to the desired output.

In supervised learning, the output generated by the neural network 1200 may be compared to a desired output, for example ground-truth data provided for training purposes, to compute an error value, for example by a loss function or a cost function. Training may be performed by minimizing or decreasing the error of the output, which may be evaluated by the loss function or the cost function. Updating the neural network may be then performed based on calculating a derivative with respect to the trainable parameters of the neural network 1200. This may be done for example using a backpropagation algorithm that determines gradients for each layer starting from the final layer of the network until gradients of trainable parameters of the different layers have been determined. The neural network may be therefore trained using the gradient descent algorithm. Parameters of each layer may be updated accordingly such that the loss is iteratively decreased. In case of reinforcement learning, the neural network 1200 may be trained without ground-truth data based on a cumulative reward to be maximized when making changes to the neural network 1200. Methods for training the neural network 1200 for determining anti-sway control terms for motion control of a suspended load are disclosed below.

Figure 13:
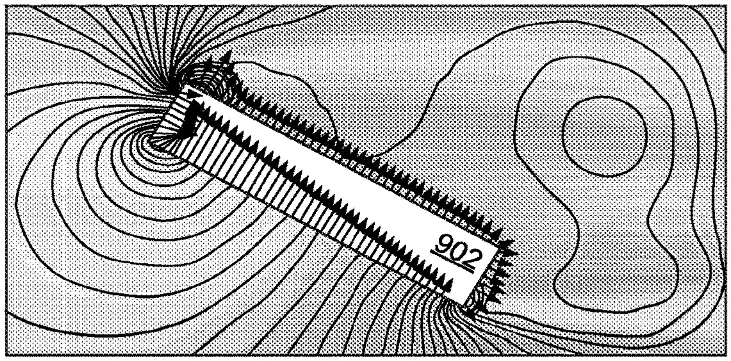
FIG. 13 illustrates an example of a wind model for training anti-sway neural networks, according to one or more example embodiments.

FIG. 13 illustrates an example of a wind model for training anti-sway neural networks, according to one or more example embodiments. Need for anti-sway control may arise for example from wind conditions prevailing in port areas. The wind may introduce forces and torques that lead to oscillation of the container 902, which may be generally undesirable in container pick and place operations. In the disclosed motion control solutions, the force/torque applied to the centre of the container 902 may be used to model the disturbance of the state caused by the wind. The wind conditions may be represented by wind speed and direction. A mapping between wind condition and the forces/torques may be determined by a wind simulation model, an example of which is provided in FIG. 13. Pressure changes caused by wind may create force distributions (black arrows) around the container 902. Resultant forces are considered as the effective force/torque values and they may be variable depending on the load angle as well as angle and speed of the wind.

Figure 14:
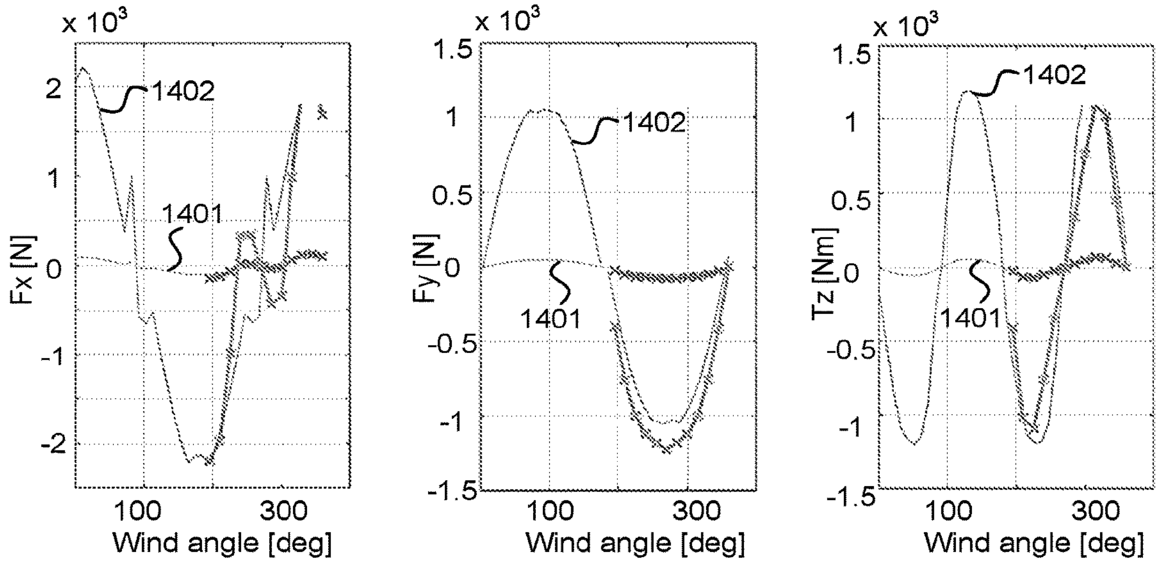
FIG. 14 illustrates an example of simulated effective wind forces and torques with respect to different on wind angles and speeds applied to a suspended load, according to one or more example embodiments.

FIG. 14 illustrates an example of simulated effective wind forces and torques with respect to different wind angles and speeds applied to a suspended load, according to one or more example embodiments. Curves 1401 and 1402 illustrate forces with respect to x-axis (Fx) and y-axis (Fy) for wind speeds 5 m/s and 20 m/s, respectively, for different wind angles. The crossed lines represent simulation results obtained by another simulation model. The dynamic wind model enables to ensure capability of the neural network based anti-sway methods to damp wind effects in variable wind conditions.

Figure 15:
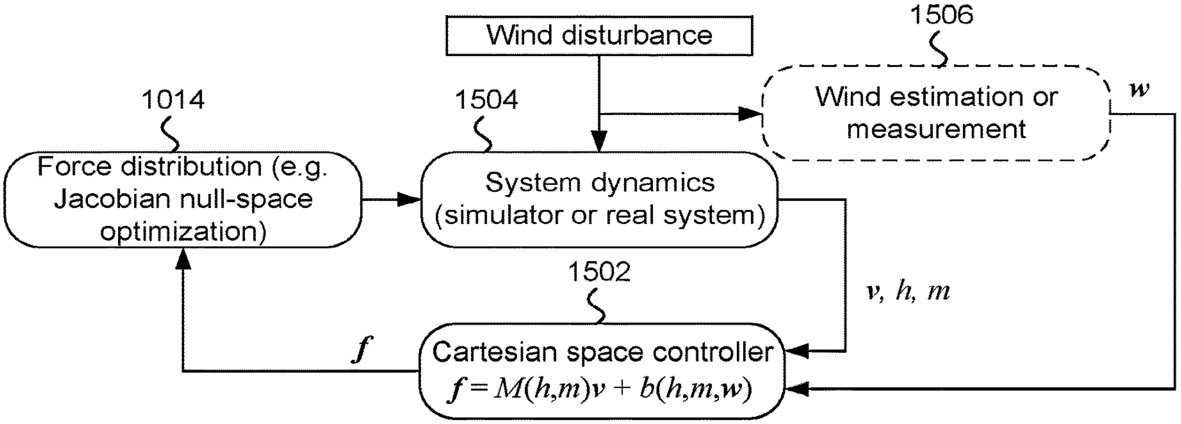
FIG. 15 illustrates an example of neural network based Cartesian space anti-sway controller, according to one or more example embodiments.

FIG. 15 illustrates an example of neural network based Cartesian space anti-sway controller, according to one or more example embodiments. The Cartesian space controller 1502 may be followed by the force distribution block 1014 comprising the multivariate force/torque mapping function (e.g. Jacobian mapping with null-space optimization), which incorporates the physical hoisting arrangement in an analytical form. Therefore, roles of each hoist may be determined analytically to produce a force acting on the container 902 in the inertial reference coordinate frame e.g., to match the force produced by the wind. In training phase of the neural network(s), the system dynamics block 1504 may include a system dynamics simulator. During operation (inference phase of the neural network(s)) the block 1504 may comprise the real crane system. It is however noted that training could also happen with the real crane system. The system dynamics block 1504 may provide velocities associated with the container 902, for example a velocity vector v comprising velocities of at least two reference points stationary with respect to the container 902 (e.g. top corners of the container 902), as input to the Cartesian space controller 1502. The Cartesian space controller 1502 may also receive from the system dynamics block 1504 the current height (h) of the container 902 from the ground and/or mass (m) of the container 902. The Cartesian space controller 1502 may determine a Cartesian space force for the anti-sway system from the given state of the system. The Cartesian space controller 1502 may be for example of the form $$f = M(h, m)v + b(h, m, w)$$

where M(h, m) and b(h, m, w) are first and second (Cartesian space) anti-sway control terms, respectively. It is however noted that use of the second anti-sway term may be optional and therefore also the wind (w) measurement/estimation block 1506 may not be present in some example embodiments. Vector $v \in R^3$ may include linear velocities of the container 902 (or the spreader/headblock) with respect to x-axis and y-axis and angular velocity in skew. The wind velocity $w \in R^2$ may indicate wind direction and speed. The anti-sway control terms may be generated by first and second neural networks, respectively. The first anti-sway control term may be a matrix, e.g. $M \in R^{3\times3}$. The second anti-sway control may be a vector, e.g. $b \in R^3$. The force f determined by the Cartesian space controller may be then distributed into desired tension forces or winch torques to damp oscillations. It is however noted that the anti-sway control may be applied on top of a Cartesian space force determined to cause a desired movement of the container 902. It is also appreciated that the Cartesian space controller could be alternatively configured to act on velocity of the container 902, for example to output a velocity rather than the Cartesian space force f.

Reinforcement learning (RL) may be applied to train a first neural network to determine the first anti-sway control term M(h, m), Similarly, a neural network may be trained to determine the second anti-sway control term b(h, m, w). The first neural network may be trained using reinforcement learning with a reward function comprising a linear velocity and an angular velocity of the container 902 at the xy-plane. According to an example embodiment, the reward function may comprise $$r = 0.5\exp\left(10^3\|v_{lin}\|^2\right) + 0.5\exp\left(10^5\|v_{ang}\|^2\right)$$

where $v_{lin}$ comprises the linear velocities with respect to the x-axis and y-axis and $v_{ang}$ comprises the angular velocity around the z-axis. When the first neural network is trained with such reward function over different heights and masses of the container 902, the first neural network learns to output a suitable first anti-sway control term M(h, m). This control term may be applied to determine appropriate Cartesian space force by the Cartesian space controller 1502 I order to damp oscillations of the container 902. This enables to mitigate undesired sway of containers having different masses, taking also into account the current height of the container.

Training of the second neural network (second anti-sway control term) may be performed for example based on the gradient descent algorithm with a cost function comprising the steady-state position and the steady-state orientation of the container 902. The first anti-sway correction term may be kept fixed during training of the second neural network. For example, the cost function may comprise $$c = 10^2\|x\|^2 + 10^2\|\gamma\|^2,$$

where x is the steady-state container position and is γ the steady-state container orientation. The steady-state position and orientation may be determined based on damping the container sway using the second anti-sway control term in each step of the optimization. When the second neural network is trained with such cost function over different heights and masses of the container 902 and wind velocities, the second neural network learns to output a suitable second anti-sway control term b(h, m, w) that may be applied to adjust the Cartesian space force based on the current wind velocity.

Similarly, it is possible to design a neural network based hoist space anti-sway controller, which determines the tension forces of torques for the hoists directly from a given state of the system. The hoist space controller for controlling the tension forces of torques of the hoist winches may be for example of the form $$\tau = \sigma(V(h, m)v + b(h, m, w)),$$

where V(h, m) and b(h, m, w) are the first and second (hoist space) anti-sway control terms, respectively. The symbol σ(•) represents a clamping function, which may be used to ensure that the controller output obeys given system limits. Similar clamping function could be applied also to the Cartesian space controller 1502. Again use of the second anti-sway control term may be optional.

Reinforcement learning may be applied to train the first neural network to determine the first (hoist space) anti-sway control term V(h, m). The second neural network may be trained to determine the second (hoist space) anti-sway control term b(h, m, w). The first neural network may be again trained using reinforcement learning with a reward function comprising velocities associated with the container 902 and a ratio between the tension forces or torques and a maximum supported anti-sway torque value. According to an example embodiment, the reward function may comprise $$r = 0.95\exp\left(10^2\|v\|^2\right) + 0.05\exp\left(\left\|\tau/\tau_{max} - 0.5\right\|^2\right),$$

where $v \in R^4$ comprises velocities of for example two top corners of the container 902 with respect to the x-axis and y-axis, $\tau \in R^4$ represents the tension forces or torques applied to the hoists, and $\tau_{max}$ is the maximum tension force of torque value supported by the system. The first term in the reward function represents damping of the system and the second term acts as a regularization that stabilizes the learning process. The optimization may be performed over variable spreader height and container weight by using domain randomization in which the state is sampled randomly at the beginning of each episode. As a result, the first neural network learns to output a suitable first anti-sway control term V(h, m) that results in an appropriate hoist space tension force or torques to be generated by the hoist space controller, in order to damp oscillations of the container 902. The RL-trained first neural network is therefore trained to produce coefficients for the matrix V(•) as function of the container mass and height. Effectively, this is followed by the multiplication with the container velocity, reducing to a linear control structure and adding thereby to robustness. Similar to the Cartesian controller 1502, a second neural network may be trained to output a suitable second (hoist space) anti-sway correction term b(h, m, w) considering also the wind velocity w.

Figure 16:
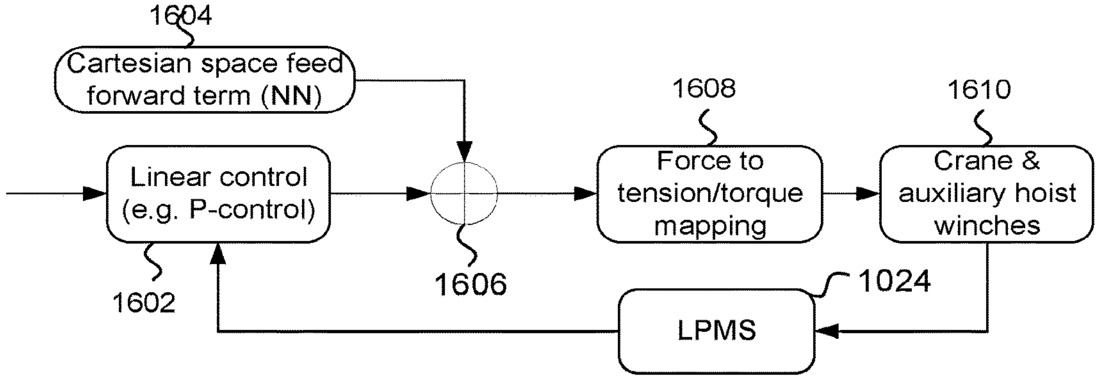
FIG. 16 illustrates an example of a linear controller with a neural network based feedforward correction term, according to one or more example embodiments.

FIG. 16 illustrates an example of a linear controller with a neural network based feedforward correction term, according to one or more example embodiments. The linear controller 1602 may be similar to the linear controller 1008. For example, the linear controller 1602 may comprise a P-controller and be configured to control movement of the container 902 based on signals received from the LPMS 1024. The linear controller 1602 may determine a Cartesian space force based on the LPMS feedback and/or desired movement of the container 902 (e.g. a command to keep the container 902 stationary).

At block 1604, a Cartesian space feedforward term may be determined. The Cartesian space feedforward correction term may be determined based on the first (Cartesian space) anti-sway correction term M(h, m) generated by the first neural network, when trained for Cartesian space control. The first neural network may take as input the mass (m) and the current height (h) of the container 902 from the ground. The first anti-sway correction term M(h, m) may be multiplied with the current velocity v of the container 902 to obtain the Cartesian space feedforward correction term. Alternatively, the first anti-sway correction term M(h, m) may be added to the current velocity v of the container 902 to obtain the Cartesian space feedforward correction term. The neural network based feedforward term may be therefore determined based on the LPMS 1024 that may provide an estimate of the current velocity of the container 902. Optionally, the second anti-sway correction term b(h, m, w) may be added to the first anti-sway correction term before applying the correction to the Cartesian space force output by the linear controller 1602. As described above, the second anti-sway correction term may be generated by a second neural network configured to take as input the wind velocity w (wind speed and/or wind direction) in addition to the mass and current height of the container 902. The current velocity v may comprise linear velocities of the container 902 (or the spreader 110) with respect to the x-axis and the y-axis and an angular velocity of the container 902 with respect to the z-axis, i.e., linear velocities with respect to two axes perpendicular to each other and parallel to the ground and angular velocity with respect to an axis perpendicular to the ground.

At block 1606, the Cartesian space force determined by the linear controller 1602 may be adjusted by the Cartesian space feedforward correction term. The Cartesian space feedforward correction term may be for example added to or multiplied with the Cartesian space force determined by the linear controller 1602.

At block 1608, the resulting Cartesian space force may be mapped to the tension forces or torques of the hoists, for example as described with reference to the force distribution block 1014.

At block 1610, the tension forces or torques may be applied to the hoists 104, e.g. by auxiliary hoist winches of the crane, to control movement of the container 902.

The LPMS 1024 may monitor the crane and/or the container 902 and provide feedback indicative of the movement of the crane or the container 902 to the linear controller 1602.

Even though the linear controller 1602 is described to output a Cartesian space force, it could be alternatively configured to act on velocities. In that case, the neural network based Cartesian space feedforward term could be applied to the velocity determined by the linear controller 1602.

As an alternative to the Cartesian space feedforward correction term 1604, the control system of FIG. 16 may be alternatively configured to control movement of the container 902 in the hoist space. Therefore, a hoist space correction term may be applied after mapping (1608) the Cartesian space force to the tension forces or torques of the hoist space.

The hoist space correction term may be determined based on the first (hoist space) anti-sway correction term V(h, m) generated by the first neural network, when trained for hoist space control. The first neural network may take as input the mass (m) and the current height (h) of the container 902 from the ground. The first anti-sway correction term V(h, m) may be multiplied with the current velocity v of the container 902 to obtain the hoist space correction term. The neural network based hoist space feedforward term may be therefore determined based on the LPMS 1024 that may provide an estimate of the current velocity of the container 902. In general, the velocity of the container 902 may comprise velocities of at least two reference points that are stationary with respect to the container 902, when the container is being hoisted or manipulated with the crane. The reference points may for example comprise corners of the container 902 or corners of the spreader 110. The velocities of the reference points may comprise for example velocities with respect to the x-axis and y-axis, i.e. two axes perpendicular to each other and parallel to the ground. Optionally, the second anti-sway correction term b(h, m, w) may be added to the first anti-sway correction term V(h, m) before applying the correction to the hoist space tension forces or torques after the force mapping block 1608. The second anti-sway correction term may be again generated by the second neural network configured to take as input the wind velocity w in addition to the mass and current height of the container 902.

Figure 17:
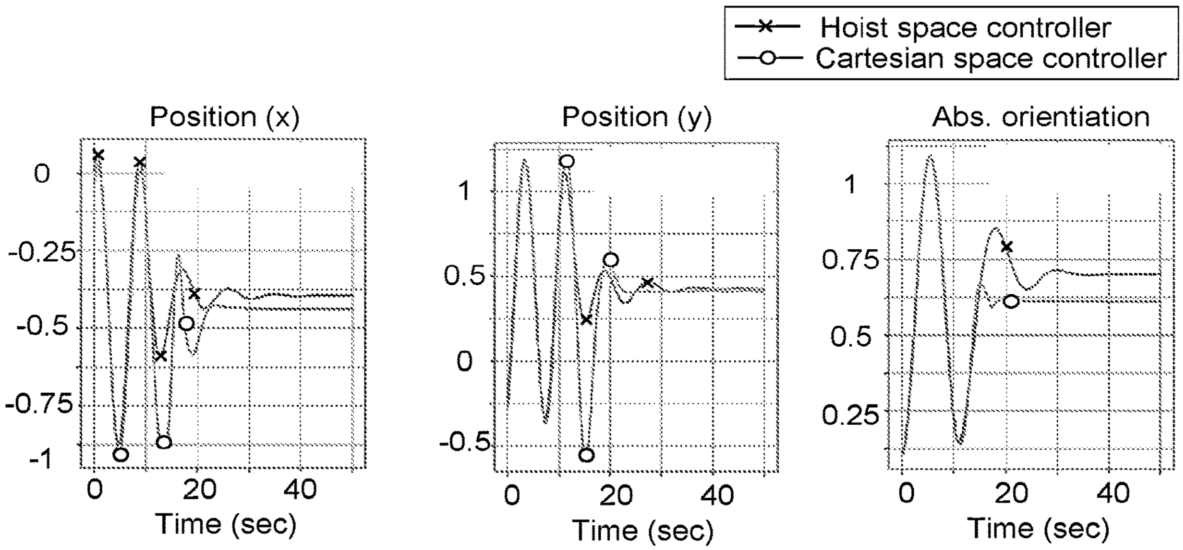
FIG. 17 illustrates an example of oscillation damping performance for neural network based hoist space and Cartesian space controllers, according to one or more example embodiments.

FIG. 17 illustrates an example of oscillation damping performance for neural network based hoist space and Cartesian space controllers, according to one or more example embodiments. The x-position, y-position, and orientation of the container 902 are illustrated for both the hoist space controller ("x") and the cartesian space controller ("o"). The x- and y-positions are provided in normalized distance units and the orientation is provided in normalized angular units. It is observed that both controllers are able to damp the sway approximately at the same time and their performance is therefore comparable. However, the hoist space controller may be implemented without any external prior knowledge about the crane kinematics or the hoisting arrangement. Also, the hoist space controller does not require to solve the optimization problem inside the control architecture, i.e., the controller may be implemented based on pure mapping from LPMS observations to the tension forces or torques of the auxiliary hoist winches. The Cartesian space controller however provides less complex optimization from the reinforcement learning point of view, smaller number of controller parameters, and therefore may enable implementation without the LPMS system to achieve cost savings without sacrificing the anti-sway performance. The Cartesian space controller may be also transferable to other kinematics crane structures by modifying the prior knowledge about the hoisting geometry/kinematics. Hence, the Cartesian space controller may be applied to different hoist geometries without extensive parameter tuning. The Cartesian space controller further enables to solve the null-space optimization during inference, which may be compatible with practices and trends in the robotics domain from the forward kinematics modeling view and therefore a broad range of control applications may be supported.

As described above, the dynamic flex compensation approach may be used in combination with the coordinated hoist control approach. Furthermore, the coordinated hoist control approach may be enhanced with neural network based correction term(s) in the Cartesian space or the hoist space. One or more of these approaches may be combined within a system or an apparatus. For example, such system could be embodied in the ASC 100 or the RTG 900. Different aspects of the present disclosure may be therefore embodied individually, or, in combination to provide an overall motion control system.

Figure 18:
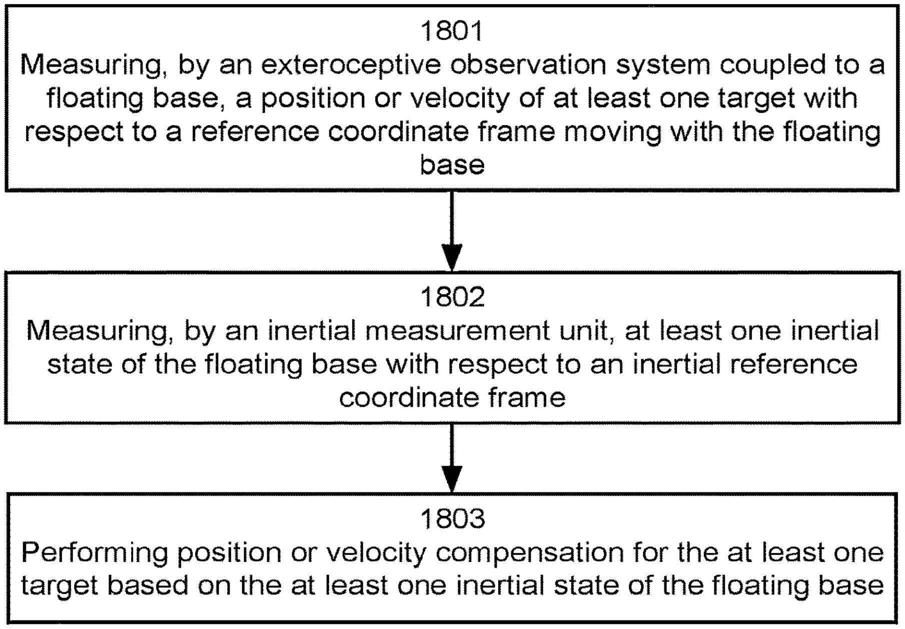
FIG. 18 illustrates an example of a method for dynamic flex compensation, according to an example embodiment.

FIG. 18 illustrates an example of a method for dynamic flex compensation, according to an example embodiment.

At 1801, the method may comprise measuring, by an exteroceptive observation system coupled to a floating base, a position or velocity of at least one target with respect to a reference coordinate frame moving with the floating base.

At 1802, the method may comprise measuring, by an inertial measurement unit, at least one inertial state of the floating base with respect to an inertial reference coordinate frame.

At 1803, the method may comprise performing position or velocity compensation for the at least one target based on the at least one inertial state of the floating base.

Figure 19:
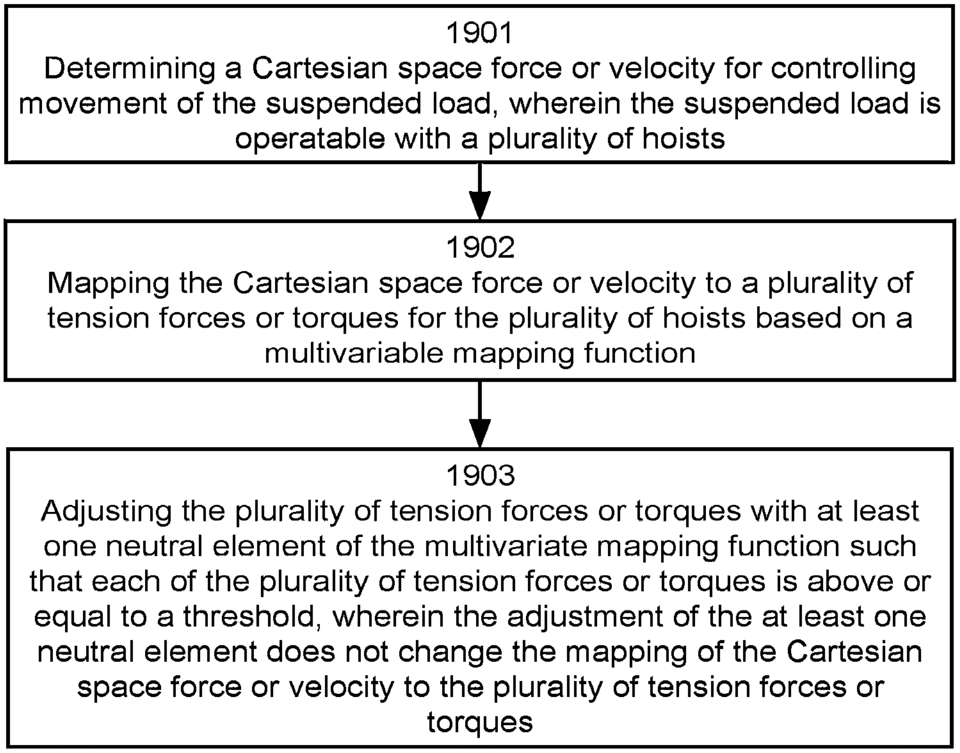
FIG. 19 illustrates an example of a method for kinematics control of a suspended load, according to an example embodiment.

FIG. 19 illustrates an example of a method for kinematics control of a suspended load, according to an example embodiment.

At 1901, the method may comprise determining a Cartesian space force or velocity for controlling movement of the suspended load, wherein the suspended load is operable with a plurality of hoists.

At 1902, the method may comprise mapping the Cartesian space force or velocity to a plurality of tension forces or torques for the plurality of hoists based on a multivariable mapping function.

At 1903, the method may comprise adjusting the plurality of tension forces or torques with at least one neutral element of the multivariate mapping function such that each of the plurality of tension forces or torques is above or equal to a threshold, wherein the adjustment of the at least one neutral element does not change the mapping of the Cartesian space force or velocity to the plurality of tension forces or torques.

Figure 20:
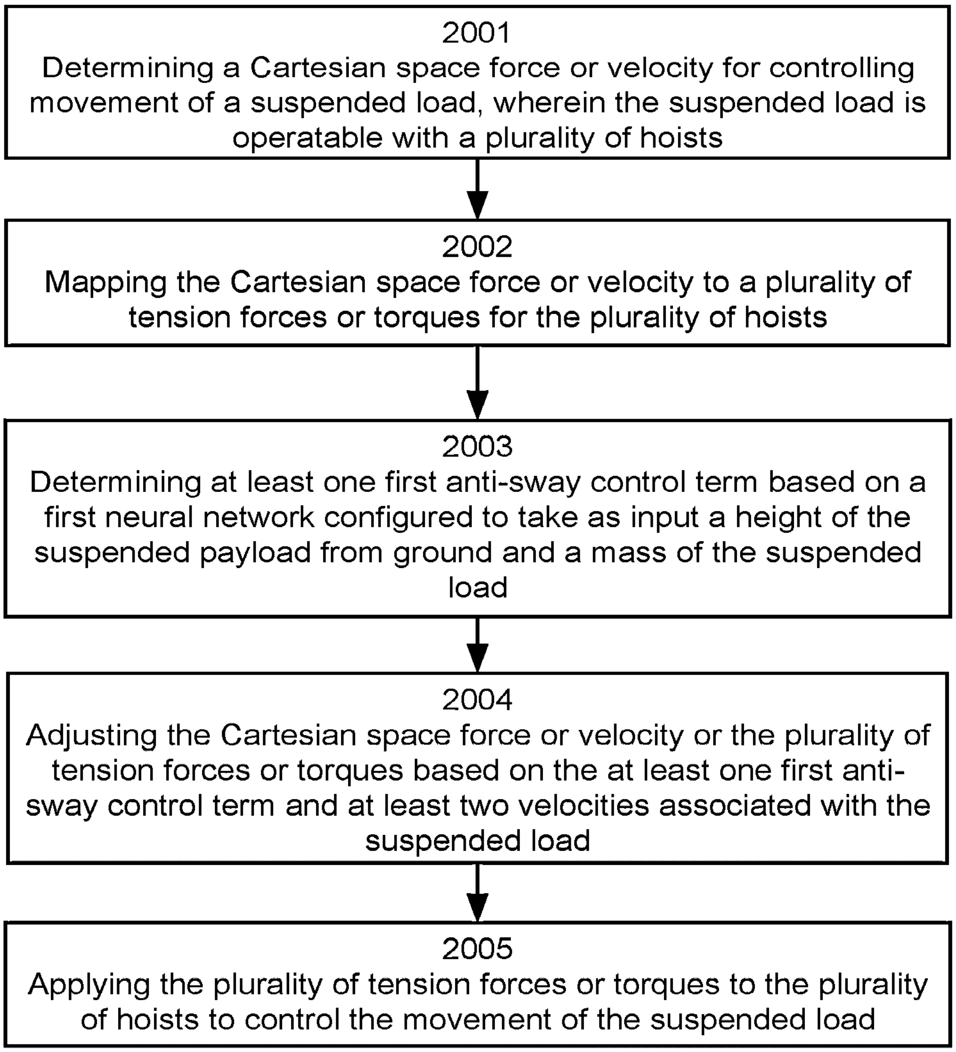
FIG. 20 illustrates an example of a method for anti-sway control of a suspended load, according to an example embodiment.

FIG. 20 illustrates an example of a method for anti-sway control of a suspended load, according to an example embodiment.

At 2001, the method may comprise determining a Cartesian space force or velocity for controlling movement of a suspended load, wherein the suspended load is operable with a plurality of hoists.

At 2002, the method may comprise mapping the Cartesian space force or velocity to a plurality of tension forces or torques for the plurality of hoists.

At 2003, the method may comprise determining at least one first anti-sway control term based on a first neural network configured to take as input a height of the suspended payload from ground and a mass of the suspended load.

At 2004, the method may comprise adjusting the Cartesian space force or velocity or the plurality of tension forces or torques based on the at least one first anti-sway control term and at least two velocities associated with the suspended load.

At 2005, the method may comprise applying the plurality of tension forces or torques to the plurality of hoists to control the movement of the suspended load.

Further features of the methods directly result from the functionalities and parameters of the apparatuses and systems described herein, as described in the appended claims, throughout the specification, and in the drawings, and are therefore not repeated here. Different variations of the methods may be also applied, as described in connection with the various example embodiments.

An apparatus may be configured to perform or cause performance of any aspect of the methods described herein. Further, a computer program may comprise instructions configured to, when executed, cause an apparatus to perform any aspect of the methods described herein. Further, an apparatus may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:

a plurality of hoists for operating a suspended load the apparatus being configured to:

determine a Cartesian space force or velocity for controlling movement of the suspended load;

map the Cartesian space force or velocity to a plurality of tension forces or torques for the plurality of hoists;

determine at least one first anti-sway control term based on a first neural network configured to take as input a height of the suspended load from ground and a mass of the suspended load;

adjust the Cartesian space force or velocity or the plurality of tension forces or torques based on the at least one first anti-sway control term and at least two velocities associated with the suspended load; and apply the plurality of tension forces or torques to the plurality of hoists to control the movement of the suspended load.

2. The apparatus according to claim 1, the apparatus being further configured to:

determine at least one second anti-sway control term based on a second neural network configured to take as input the height of the suspended load from the ground, the mass of the suspended load, and wind speed and/or wind direction; and adjust the Cartesian space force or velocity or the plurality of tension forces or torques further based on the at least one second anti-sway control term.

3. The apparatus according to claim 1, wherein the at least one first anti-sway control term comprises an anti-sway control matrix, and wherein the adjustment of the Cartesian space force or velocity or the plurality of tension forces or torques comprises a multiplication or a sum of the anti-sway control matrix and a velocity vector comprising the at least two velocities associated with the suspended load.

4. The apparatus according to claim 2, wherein the at least one first anti-sway control term comprises an anti-sway control matrix, and wherein the adjustment of the Cartesian space force or velocity or the plurality of tension forces or torques comprises a multiplication or a sum of the anti-sway control matrix and a velocity vector comprising the at least two velocities associated with the suspended load.

5. The apparatus according to claim 2, wherein the at least one second anti-sway control term comprises an anti-sway control vector, and wherein the adjustment of the Cartesian space force or velocity or the plurality of tension forces or torques further comprises addition of the anti-sway control vector to a result of the multiplication or the sum of a anti-sway control matrix and a velocity vector.

6. The apparatus according to claim 4, wherein the at least one second anti-sway control term comprises an anti-sway control vector, and wherein the adjustment of the Cartesian space force or velocity or the plurality of tension forces or torques further comprises addition of the anti-sway control vector to a result of the multiplication or the sum of the anti-sway control matrix and the velocity vector.

7. The apparatus according to claim 2, the apparatus being further configured to:

adjust the plurality of tension forces or torques based on the at least one first anti-sway control term and/or the at least one second anti-sway control term, wherein the first neural network is configured to determine the anti-sway control term for hoist space control.

8. The apparatus according to claim 6, the apparatus being further configured to:

adjust the plurality of tension forces or torques based on the at least one first anti-sway control term and/or the at least one second anti-sway control term, wherein the first neural network is configured to determine the anti-sway control term for hoist space control.

9. The apparatus according to claim 7, wherein the at least two velocities comprise velocities of at least two reference points stationary with respect to the suspended load.

10. The apparatus according to claim 9, wherein the at least two velocities comprise velocities of at least two reference points stationary with respect to the suspended load.

11. The apparatus according to claim 10, wherein the velocities of the at least two reference points comprise velocities with respect to a first axis and a second axis, wherein the first axis and the second axis are perpendicular to each other and parallel to the ground.

12. The apparatus according to claim 11, wherein the velocities of the at least two reference points comprise velocities with respect to a first axis and a second axis, wherein the first axis and the second axis are perpendicular to each other and parallel to the ground.

13. The apparatus according to claim 9, wherein the at least two reference points comprise at least two corners of a spreader coupled to the plurality of hoists or at least two corners of the suspended load, wherein the spreader is configured to be attached to the suspended load.

14. The apparatus according to claim 12, wherein the at least two reference points comprise at least two corners of a spreader coupled to the plurality of hoists or at least two corners of the suspended load, wherein the spreader is configured to be attached to the suspended load.

15. The apparatus according to claim 1, the apparatus being further configured to:

adjust the Cartesian space force or velocity based on the at least one first anti-sway control term and/or the at least one second anti-sway control term, wherein the first neural network is configured to determine the first anti-sway control term for Cartesian space control.

16. The apparatus according to claim 6, the apparatus being further configured to adjust the Cartesian space force or velocity based on the at least one first anti-sway control term and/or the at least one second anti-sway control term, wherein the first neural network is configured to determine the first anti-sway control term for Cartesian space control.

17. The apparatus according to claim 15, further comprising:

a linear controller configured to determine the Cartesian space force or velocity for controlling the movement of the suspended load based on a set of desired input values and feedback data indicative of the movement of the suspended load.

18. The apparatus according to claim 16, further comprising:

a linear controller configured to determine the Cartesian space force or velocity for controlling the movement of the suspended load based on a set of desired input values and feedback data indicative of the movement of the suspended load.

19. The apparatus according to claim 15, wherein the at least two velocities comprise a linear velocity of the suspended load with respect to a first axis, a linear velocity of the suspended load with respect to a second axis, and an angular velocity of the suspended load with respect to a third axis, and wherein the first axis and the second axis are perpendicular to each other and parallel to the ground and the third axis is perpendicular to the first axis and the second axis.

20. The apparatus according to claim 18, wherein the at least two velocities comprise a linear velocity of the suspended load with respect to a first axis, a linear velocity of the suspended load with respect to a second axis, and an angular velocity of the suspended load with respect to a third axis, and wherein the first axis and the second axis are perpendicular to each other and parallel to the ground and the third axis is perpendicular to the first axis and the second axis.

21. The apparatus according to claim 1, wherein the first neural network comprises a neural network trained based on reinforcement learning with a first reward function comprising a linear velocity and an angular velocity of the suspended load at a plane defined by a first axis and a second axis or with a second reward function comprising the at least two velocities associated with the suspended load and a ratio between the plurality of tension forces or torques and a maximum supported anti-sway torque value.

22. The apparatus according to claim 20, wherein the first neural network comprises a neural network trained based on reinforcement learning with a first reward function comprising a linear velocity and an angular velocity of the suspended load at a plane defined by the first axis and the second axis or with a second reward function comprising the at least two velocities associated with the suspended load and a ratio between the plurality of tension forces or torques and a maximum supported anti-sway torque value.

23. The apparatus according to claim 2, wherein the second neural network comprises a neural network trained based on a gradient descent algorithm with a cost function comprising a steady-state position and a steady-state orientation of the suspended load.

24. The apparatus according to claim 22, wherein the second neural network comprises a neural network trained based on a gradient descent algorithm with a cost function comprising a steady-state position and a steady-state orientation of the suspended load.

25. A method, comprising:

determining a Cartesian space force or velocity for controlling movement of a suspended load, wherein the suspended load is operable with a plurality of hoists;

mapping the Cartesian space force or velocity to a plurality of tension forces or torques for the plurality of hoists;

determining at least one first anti-sway control term based on a first neural network configured to take as input a height of the suspended load from ground and a mass of the suspended load;

adjusting the Cartesian space force or velocity or the plurality of tension forces or torques based on the at least one first anti-sway control term and at least two velocities associated with the suspended load; and applying the plurality of tension forces or torques to the plurality of hoists (104) to control the movement of the suspended load.

26. A non-transitory computer-readable media comprising instructions configured to, when executed, cause an apparatus to:

determine a Cartesian space force or velocity for controlling movement of a suspended load, wherein the suspended load is operable with a plurality of hoists;

map the Cartesian space force or velocity to a plurality of tension forces or torques for the plurality of hoists;

determine at least one first anti-sway control term based on a first neural network configured to take as input a height of the suspended load from ground and a mass of the suspended load;

adjust the Cartesian space force or velocity or the plurality of tension forces or torques based on the at least one first anti-sway control term and at least two velocities associated with the suspended load; and apply the plurality of tension forces or torques to the plurality of hoists to control the movement of the suspended load.

* * * * *